(12) United States Patent
Williamson

(10) Patent No.: US 6,343,021 B1
(45) Date of Patent: Jan. 29, 2002

(54) UNIVERSAL INPUT/OUTPUT POWER SUPPLY WITH INHERENT NEAR UNITY POWER FACTOR

(76) Inventor: Floyd L. Williamson, 1906 Shellbrook Dr., Huntsville, AL (US) 35806

( * ) Notice: Subject to any disclaimer, the term of this patent is extended or adjusted under 35 U.S.C. 154(b) by 0 days.

(21) Appl. No.: 09/567,248

(22) Filed: May 9, 2000

(51) Int. Cl.[7] .............................................. H02M 5/293
(52) U.S. Cl. ........................... 363/8; 363/163; 363/164; 363/165
(58) Field of Search ................................ 363/1, 8, 157, 363/159, 163, 164, 165

(56) References Cited

U.S. PATENT DOCUMENTS 3,517,300 A * 6/1970 McMurray .................. 363/163
3,564,390 A * 2/1971 Stratton ...................... 363/159

* cited by examiner

*Primary Examiner*—Jeffery Sterrett
(74) *Attorney, Agent, or Firm*—Bradley Arant Rose & White, LLP

(57) ABSTRACT

An electronic method and apparatus are described for an isolated, universal input, power supply in the form of a single-ended resonant converter that utilizes capacitive energy storage versus magnetic energy storage, for converting an ac or DC input voltage to a variable voltage and current DC output or a variable ac output voltage, current, frequency, or phase. The preferred topology is a direct ac to ac, single-ended resonant converter using a single switch (4) and integrated magnetic element (1) with inherent near-unity power factor. Advantages of this method include a significant reduction in global energy consumption, simpler circuitry, substantially lower cost, higher efficiency, and longer operational life.

31 Claims, 19 Drawing Sheets

Direct offline ac/DC

Direct offline ac/ac

Direct offline ac/DC

Direct offline ac/ac ac/ac - prior art

DC/DC - prior art

Canonical switching cell - prior art

Direct converter - prior art

Ćuk - prior art isolated Ćuk - prior art

SEPIC - prior art isolated SEPIC - prior art buck-boost - prior art

DC/ac

DC/DC

Non-isolated ac/ac single-ended with pulsed-DC
excitation - prior art (HIGHLY EXAGGERATED NON-SYMMETRY)

single-ended with ac excitation (HIGHLY EXAGGERATED NON-SYMMETRY)

Start-up, snubber, & energy-recovery circuit

Equivalent circuit - switch-4 closed

Classic equiv. circuit - switch-4 closed

Secondary reflected impedance - switch-4 closed

Simplified equiv. circuit - switch-4 closed

Equivalent circuit - switch-4 open

Classic equiv. circuit - switch-4 open

Primary reflected impedance - switch-4 open

Simplified equiv. circuit - switch-4 open

UNIVERSAL INPUT/OUTPUT POWER SUPPLY WITH INHERENT NEAR UNITY POWER FACTOR

FIELD OF INVENTION

This invention relates to a method and apparatus for an isolated, universal input, power supply, in the form of a unique single-ended resonant topology that utilizes capacitive-energy storage versus magnetic-energy storage, for converting an ac or DC input voltage to a variable voltage and current DC output or a variable ac output voltage, current, frequency, and/or phase, using a single switch and single integrated-magnetic device with inherent near-unity power factor, excellent efficiency, high power density, and very low cost.

BRIEF DESCRIPTION OF THE DRAWINGS

FIG. 4 also illustrates an indirect-converter.

BACKGROUND OF THE INVENTION

Three basic configurations exist in the power supply field. The three configurations are buck, boost, and buck-boost. All power supply topologies fall into one of these configurations. The buck regulator implies the conversion of a higher voltage-level to a lower-voltage level. The boost implies a conversion from a lower-voltage to a higher-voltage. The buck-boost gives a conversion from one voltage-level to either a higher, equal, or lower level. The introduction of high-frequency (tens of kilohertzs) switching power supplies overcame the weight, size, and efficiency limitations of low-frequency (tens to hundreds of hertzs) power-supplies. Since this introduction, the definition of high frequency and the merits of very high frequencies have diverged along two philosophies. One philosophy advocates the use of integrated magnetics, modest switching frequencies (tens to hundreds of kilohertzs), and topologies such as the Ćuk converter to obtain the best compromise of efficiency, size, and cost. Whereas the other philosophy advocates very high switching frequencies (megahertzs) and topologies such as quasi-resonant converters to accomplish the best compromise. The fact remains that there are always compromises from the optimum.

MIT-professors Kassakian, Schlecht, and Verghese present an in-depth overview of the fundamental principles, concepts, techniques, methods, and topologies in their book *Principles of Power Electronics*. Part I of the book is dedicated to the form (topology) and function of power circuits and is used as the foundation for the following discussion. The introduction and part I of the book are hereby incorporated by reference.

Figure 2:
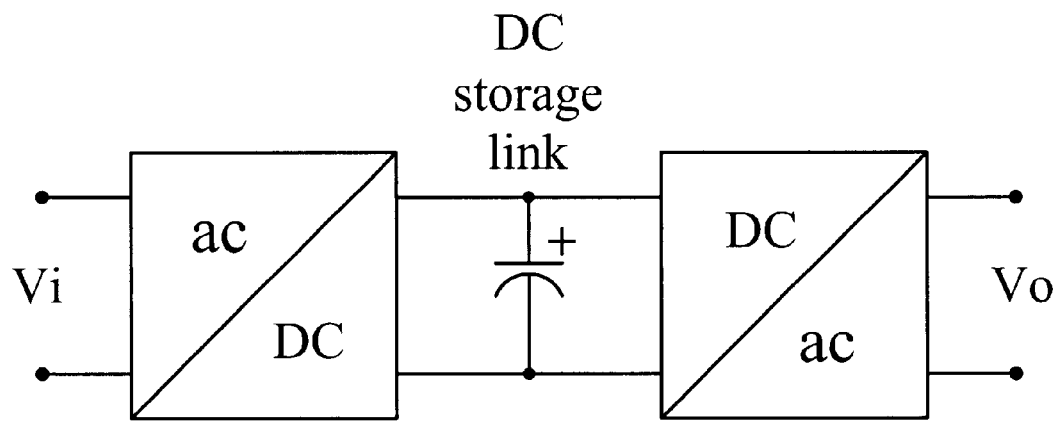
FIG. 2 is a block-diagram illustrating the essential elements of prior art ac-to-ac conversion and the process from ac to DC, DC storage, and the reconversion of DC back to an ac.
Figure 3:
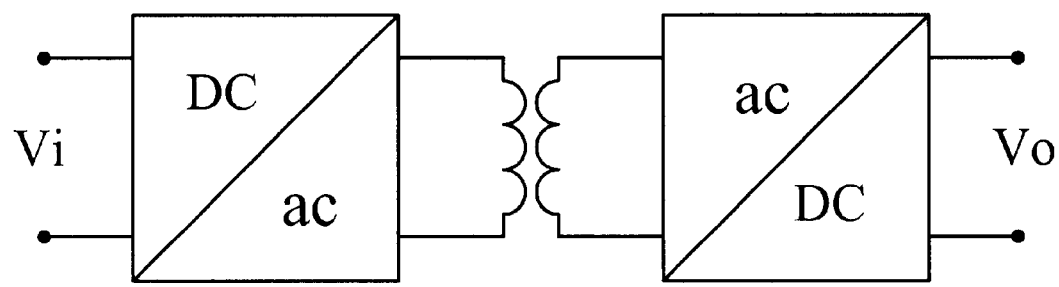
FIG. 3 is a block-diagram illustrating the essential elements of prior art isolated DC-to-DC conversion and the process from DC to ac, transformer coupling, and the reconversion from an ac back to DC.

Kassakian et al, pages 23–26, shows that the simplest ac to ac (ac/ac) converter that can deliver output waveforms of different amplitudes, frequency, and/or phases is the so-called dc-link converter. FIG. 2 shows the DC link ac/ac converter. The method converts the input ac to DC, stores the energy in the load-balancing DC energy-storage link, and then reconverts the DC into an ac waveform. Likewise, Kassakian et al show that the simplest isolated DC to DC (DC/DC) switching-converter must convert the DC to an ac, transferring or coupling of the energy from input to output, and then reconvert the ac to a DC. The isolated DC/DC is shown in FIG. 3.

Figure 4:
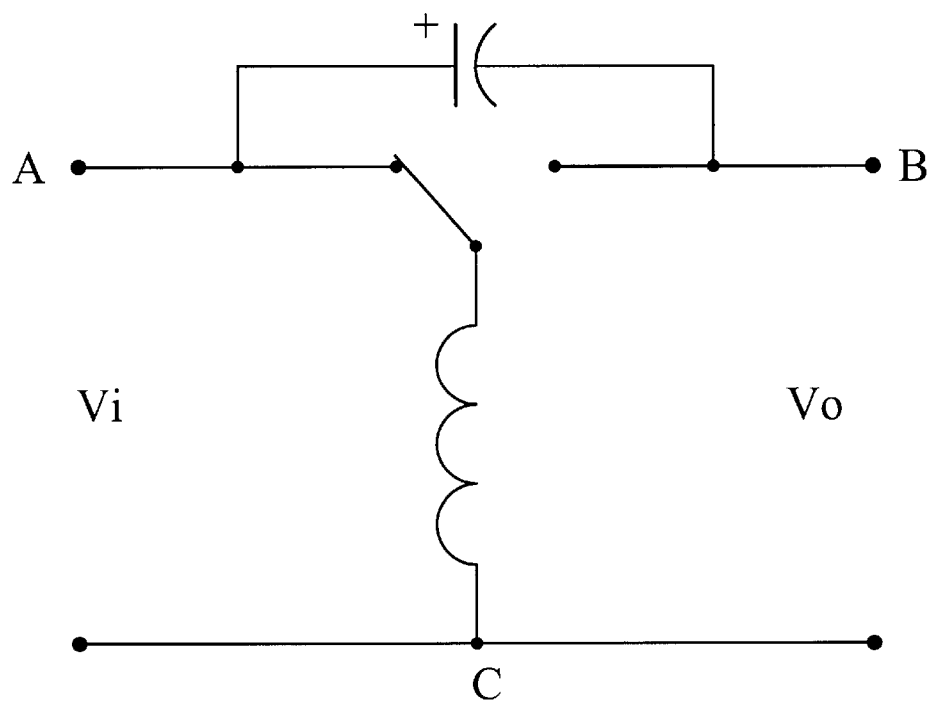
FIG. 4 is a simplified schematic-diagram illustrating the essential elements of prior art DC-to-DC conversion in the simplified form of the canonical switching cell.

From a more fundamental view, Kassakian et al, pages 103–131, developed a canonical switching cell to represent the simplest possible topology for a non-isolated DC/DC converter. This canonical switching cell is depicted in FIG. 4. The cell consists of a single SPDT switch, one inductor, and one capacitor. The SPDT switch is characterized as never being simultaneously 'on' or 'off' at the same time. The electronic implementation of a SPDT switch requires two electronic switches, such as a transistor and a diode. The two important aspects of the canonical switching cell are it represents the simplest known topology and all other known switching topologies derive from this basic configuration.

Figure 5:
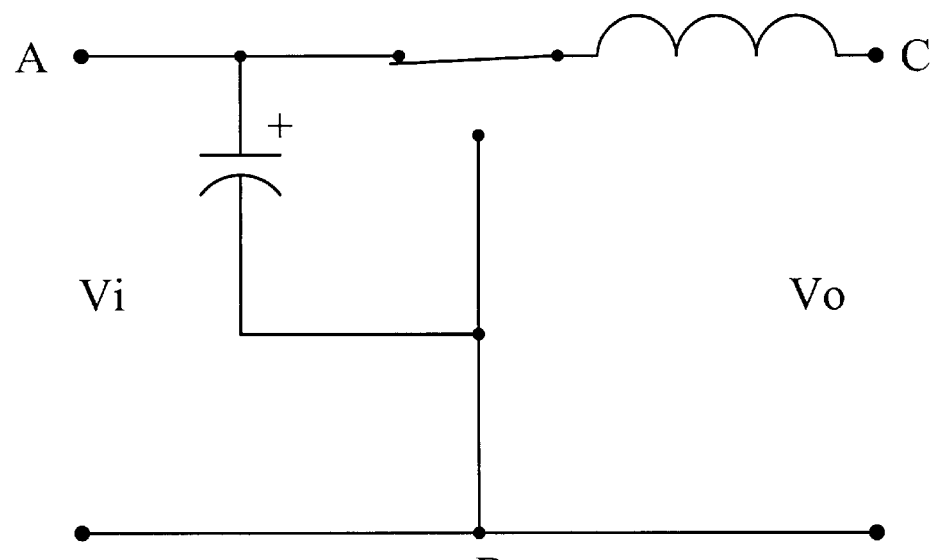
FIG. 5 is a simplified schematic-diagram illustrating the essential elements of a prior art direct-converter switching-regulator.

The canonical switching cell is known as an indirect converter because there is no direct DC path from input to output. Rearrangement of the canonical switching cell topology yields the direct converter shown in FIG. 5. The designation as a direct converter results because a direct DC path exists from input to output. The cell has the same elements as the canonical switching cell but with a different configuration or topology. The non-isolated direct converter (buck) output voltage ($V_o$) to input voltage ($V_i$) gain ratio is proportional to the duty-cycle ($\delta$) by the equation $$\frac{V_o}{V_i} = \delta$$

The non-isolated indirect converter (buck-boost) gain ratio is $$\frac{V_o}{V_i} = \frac{\delta}{1-\delta}$$

The boost has a gain ratio of $$\frac{V_o}{V_i} = \frac{1}{1-\delta}$$

Isolated switching-converters can be further classified as single-ended or double-ended. Single-ended implies that a single switch drives the primary circuit and double-ended obviously implies two switches on the primary. The advantage of the double-ended topologies is the output DC excitation is symmetrical. The output symmetry reduces the size of the transformer and reduces the output ripple thus reducing the filtering requirements. The unipolar-excitation in the single-ended topologies increases the size of the magnetic and capacitive elements, decreases efficiency, and increases the stress on the components.

Early switching topologies such as buck, boost, flyback, forward, push-pull, half-bridge, and full-bridge were all derived from the principles of the canonical switching cell. The Single-Ended-Primary-Inductor-Converter (SEPIC) was introduced, around 1977, as a new non-isolated buck-boost topology. In the isolated version, the SEPIC input circuit behaves like a boost and the output circuit like a buck-boost. In 1980, the DC/DC Ćuk converter was introduced in U.S. Pat. No. 4,184,197, issued to Ćuk and Middlebrook, as well as the concept of integrated-magnetic coupling-inductors. In 1988, the very high-frequency quasi-resonant converter was patented in U.S. Pat. No. 4,720,667, issued to Lee et al. The SEPIC and Ćuk topologies have had limited acceptance in the power-conversion engineering field. The early, classical topologies still dominate while the high-frequency quasi-resonant converter is gaining acceptance.

Figure 6:
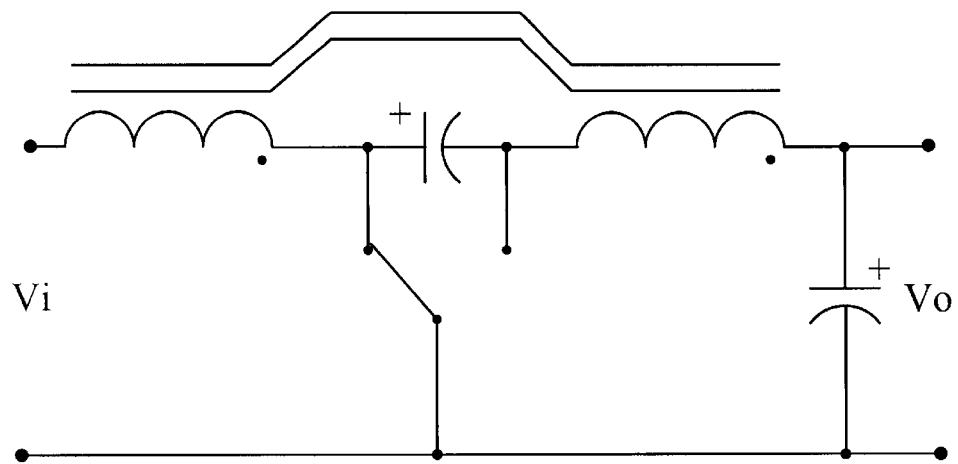
FIG. 6 is a simplified schematic-diagram illustrating the essential elements of a prior art Ćuk-type, non-isolated, switching-converter with integrated-magnetic coupling-inductors.
Figure 7:
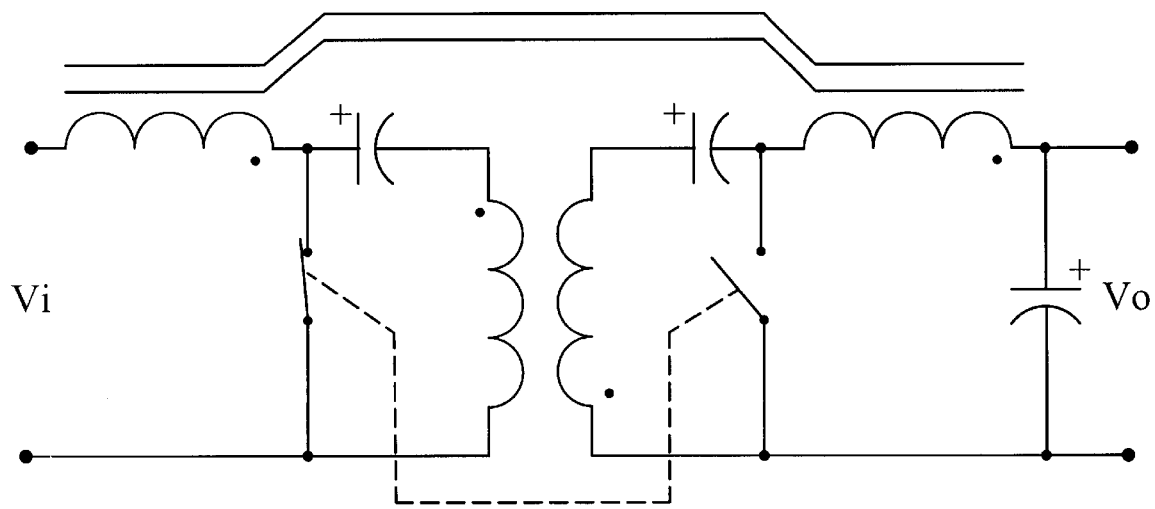
FIG. 7 is a simplified schematic-diagram illustrating the essential elements of a prior art Ćuk-type, isolated, switching-converter with integrated-magnetic coupling-inductors.
Figure 8:
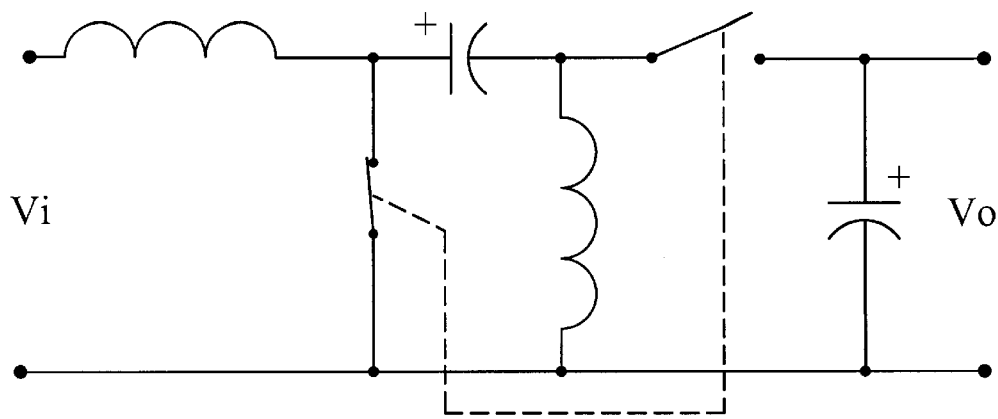
FIG 8 is a simplified schematic-diagram illustrating the essential elements of a prior art SEPIC (Single-Ended-Primary-Inductor-Converter) non-isolated switching-converter.
Figure 9:
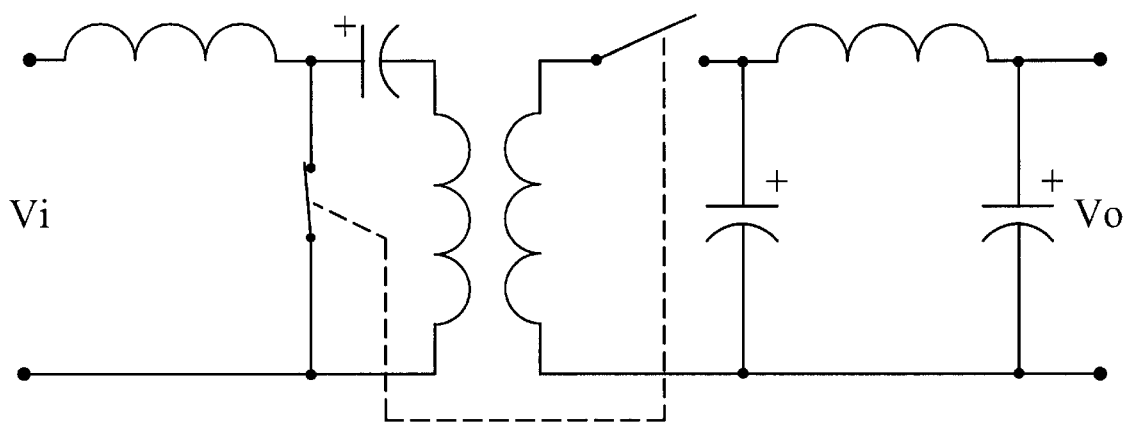
FIG. 9 is a simplified-schematic-diagram illustrating the essential elements of a prior art SEPIC isolated switching-converter.
Figure 10:
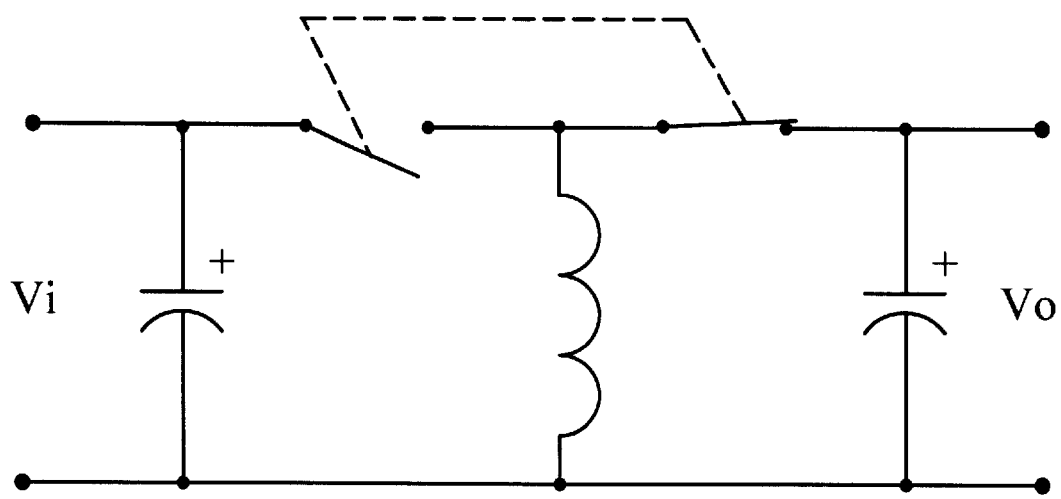
FIG. 10 is a simplified-schematic-diagram illustrating the essential elements of a prior art buck-boost, non-isolated, switching-converter typical of the type used for off-line power-factor-correction.

A simplified schematic-diagram of a non-isolated Ćuk converter is shown in FIG. 6. A simplified schematic-diagram of an isolated Ćuk converter is given in FIG. 7. Likewise, FIG. 8 and FIG. 9 give simplified schematic-diagrams for non-isolated and isolated SEPIC converters, respectively. The two topologies are quite similar with only minor topology changes in the output circuits. Both converters store energy in the inductors and transfer the energy via energy-transfer capacitors. The biggest but subtle difference is the symmetry of the Ćuk topology that allows the use of integrated-magnetic coupling-inductors. Ćuk explains that the key is the duality of the inductor-waveforms and that the waveforms share the same shape, frequency, and phase. The duality relates to the maintenance of volt-second balance in the coupled-inductors. This unique feature allows the ripple-current in the output or input to be steered to the other side. This ripple-current steering can greatly reduce the ripple-voltage on the input and/or output. The problem with the ripple-current steering is that the current is steered to the inner-loop on the opposite side. This steered ripple-current greatly increases the inner-loop peak-current with the expected increases in component stress and power dissipation.

The Ćuk and SEPIC converters are both indirect converters and the output can be greater, equal, or lower than the input voltage. The SEPIC has one advantage over the Ćuk converter. The Ćuk has a right-half-plane (RHP) zero in the control-to-output transfer-function and the SEPIC does not. A RHP zero causes a 20-dB rise in gain, per decade of increasing frequency but with a 90°-phase lag. (*Principles of Power Electronics*, page, pages 286–293 and pages 373–379) The RHP zero is not a circuit-instability but it greatly complicates the process of obtaining optimum loop-feedback and dynamic-response. A RHP zero will occur any time a switch is placed between the output inductor and capacitor. Another factor in the cause of the RHP zero is a frequency-dependency, in the transfer-function, because of the duty-cycle ($\delta$). All known boost and buck-boost converters, except SEPIC, have a RHP zero.

Energy storage in an air-gap is well known (*Principles of Power Electronics*, pages 569–589). A gap in the core will lower the core permeability and make the inductance-value independent of the flux-density ($B_m$). The amount of energy ($\omega_g$ [mJ]) that can be stored is the product of the air-gap ($1_g$ [cm]) and the cross-sectional area ($A_c$ [cm$^2$]) and is calculated per the formula $$\omega_g = \frac{(B_m)^2}{2\mu_o}(l_g \times A_c)$$

The absolute permeability ($\mu_o$) is equal to a value of $4\pi \times 10^{-7}$ H/m. An iron-core can store roughly 780 mJ/cm$^3$ at a maximum flux density of 1.4 Teslas (T) and a ferrite-core can store roughly 35.8 mJ/cm$^3$ at a maximum flux density of 0.3 T. As an example, a ferrite core operating at 0.2 T with a 0.1 cm$^3$ gap can store 1.59 mJ of energy. If this ferrite core is operated at 50 kHz, the 0.1 cm$^3$ gap can handle roughly 80 Watts of DC energy without saturation. Operating at 1.5 MHz, the same flux density and gap can theoretically (the limitation caused by the ratio of magnetizing-inductance to leakage-inductance will be discussed later) handle roughly 30 times or 2,385 Watts of DC energy. The magnetic-energy storage ($\omega_g$) of the transformer is given by $$\omega_m = \frac{1}{2}Li^2$$

Gapping a transformer allows the transformer to accommodate greater DC energy-storage without saturating. An imbalance in the volt-second balance of a transformer can cause core-saturation if a sufficient gap is not provided. This problem is obvious with DC unipolar-excitation but a volt-second imbalance can also occur in double-ended topologies because the excitation is pulsed-DC and not a true ac excitation.

The SEPIC, Ćuk, forward, and flyback converters are single-ended topologies and take the form shown in FIG. 3. Unipolar DC excitation creates the potential for a volt-second imbalance in the transformer. Despite this fact, Ćuk argues that the isolation transformer in the Ćuk converter can theoretically operate with no air gap. At a minimum, any topology with a single-ended drive will require some gap to avoid saturation under transient conditions, such as start-up. The forward converter requires a modest gap and the flyback converter a large gap.

The flyback transformer is not a true-transformer in that it stores a large amount of energy when the primary is conducting and the output winding acts as a storage inductor when delivering the energy to the secondary. Ćuk argues that the isolation transformer in the SEPIC is essentially a flyback transformer with the same large gap requirement and high transformer DC-currents. In U.S. Pat. No. 5,583,421, issued to Barbehenn et al, the SEPIC transformer is replaced with two coupling-capacitors to overcome the noise-spikes associated with the transformer's very high leakage-inductance. The converter is a modified form of the topology depicted in FIG. 3.

In U.S. Pat. No. 5,115,185, issued to Fraidlin et al, a SEPIC was introduced with power-factor-correction. The apparatus included a hold-over circuit to power the unit momentarily during an ac power failure. The converter takes the form depicted in FIG. 3.

In U.S. Pat. No. 4,720,667, Lee et al disclosed roughly forty-two, single-ended, non-isolated, high-frequency, quasi-resonant topologies plus 9 isolated-single-ended versions. Key features of the topologies are sinusoidal currents; operation at greater than 1 MHz; and a zero-current-switching (ZCS) condition. The converters are similar to the Ćuk and SEPIC converters but generally more complex. The advantages of the sinusoidal currents and ZCS-operation are the switching losses, in the switching devices, are greatly decreased and the switching devices can be operated at higher frequencies than possible with pulsed-DC converters. The advantage of operating at very high frequency is a reduction in the size of the magnetic and capacitive elements. Some of the disclosed quasi-resonant topologies have a RHP zero and others do not. The isolated versions follow the form given in FIG. 3.

U.S. Pat. No. 5,442,539, issued to Ćuk et al, discloses a DC-DC Ćuk converter with unity power-factor operation based on a single integrated-magnetic element. Key advantages include low in-rush currents, unity power-factor, and small-size magnetics operating at modest switching-frequencies, on the order of 40 kHz. Disadvantages include the high switching-currents in the primary switch and the need for increased protection for the switching elements. The converter takes the form shown in FIG. 3.

Ćuk and Middlebrook correctly argue that operating a switching power supply at very high-frequencies (>1 MHz) introduces problems that more than offset the size advantages. Their point is related to the relationship between the switching-current and the high-frequency noise-spikes. The switching-current or di/dt is proportional to the switching-frequency which is inversely proportional to the magnetizing-inductance ($L_M$). The noise spike di/dt that is generated is related to the ratio of the leakage-inductance ($L_L$) to the magnetizing-inductance or $L_L/L_M$. The problem arises because the magnetizing-inductance and transformer-size decrease with increasing frequency but the leakage-inductance does not decrease proportionally with the increasing frequency. Therefore, the ratio of leakage-inductance to magnetizing-inductance increases as the frequency increases, thus the noise current-spikes increase as well. The very high current-spikes create switching-losses, component stress, power supply noise, and EMI. The high-frequency quasi-resonant converters do deliver some of the highest energy-densities but at a considerably higher cost and degree of complexity. The Unitrode application note U-110, 1.5 MHZ *CURRENT MODE IC CONTROLLED 50 WATT POWER SUPPLY*, provides a very good design reference that highlights the complexity of designing for very high-frequencies, such as the need for Litz wire, and the resulting relatively-low-efficiency (~75%).

Ćuk and Zhang provide a design guide for coupling-inductors in *COUPLED-INDUCTOR ANALYSIS AND DESIGN*. The paper highlights the principles of ripple-current steering and the gapping requirements for achieving optimum coupled-inductors. The paper clearly explains the critical nature of the core gapping issues. Bloom in *Core selection for integrated-magnetic power converters* gives a background discussion on integrated-magnetic structures and discusses the critical issues for gapping and sizing the cores.

Ćuk and Middlebrook explain the advantage of an integrated-magnetic element over individual magnetic elements. The advantage is based in the Magnetic-Scaling law. The Magnetic-Scaling law shows that the power-handling capability of a core (cm$^4$) increases to the $4^{th}$ power as the core volume (cm$^3$) increases to the $3^{rd}$ power. The power-handling capability of a core is related to the area-product ($A_p$) by the formula $$A_P = A_c W_a$$

With the cross-sectional area ($A_c$) in cm$^2$ and the window-area ($W_a$) in cm$^2$. Integrating individual elements into a single, smaller-core allows greater utilization of the available power-handling capability for a given volume. The gain advantage can be two times the power-handling in a core only 1.2 times the volume and weight of the smaller core.

Ripple-current steering in the Ćuk converter means very high switching-currents (di/dt) that are even higher than the switching-currents in a flyback topology. Other than the listed disadvantages, ripple-current steering can be successfully achieved in the Ćuk converter with integrated coupled-inductors. It is clearly theoretically and experimentally possible to successfully integrate the transformer with the coupling-inductors into a single element. However, the practical implementation of a single integrated-magnetic element in a Ćuk converter is less clear.

As outlined in Bloom's and Ćuk papers, as well as numerous other papers and design notes, to achieve proper operation of the integrated-magnetic coupling-inductors, the gapping and possibly the cross-sectional area of the core needs to be tailored to the required inductance value, switching-frequency, and energy storage requirements. Ripple-steering also requires a precise or critical ratio between the inductors. As stated, Ćuk argues that the transformer in the Ćuk converter does not require any gap at all. To achieve an optimum design, the core would require three independent gaps (possibly three different cross-sectional areas as well). Ćuk argues that a single uniform core gap can be used. Ćuk and Middlebrook have demonstrated that the center-winding's leakage-inductance is the most critical design parameter in the design of the integrated-magnetic element. They have also shown that the winding configuration suitable for a transformer is the worst-configuration for coupled-inductors. When the integrated-magnetic element is designed with a uniform-gap, all three independent elements have to be compromised. Adding the gap in the transformer lowers the magnetizing-inductance but does not lower the leakage inductance. The large-gap in the transformer results in very high-peak currents, energy storage, a high leakage-inductance, and higher-switching losses.

Using Ćuk's SEPIC argument and the fact that the excitation is unipolar, one would have to classify the integrated-Ćuk-transformer as a flyback transformer. One of the coupling-inductors will have less than the optimum gap and a transient-condition, such as a severe load change, could cause that inductor to saturate. Ćuk has acknowledged this problem and argues that one inductor will saturate first but that the only consequence will be an increase in the ripple voltage and/or current. From a practical viewpoint, if the filtering components are designed for the desired optimum ripple-current condition, a sudden increase in the load current can cause severe or even catastrophic effects on the load-circuitry. On the other hand, if the components have to be designed to handle the potential ripple caused by the inductor-saturation then the claimed advantages of small size are lost. Clearly, the unequal gapping problem can be solved for the coupling-inductors but not so for the integrated-transformer.

Further, Ćuk and Middlebrook's argument that reducing the magnetizing inductance ($L_m$) is restricted by the decreasing ratio of $L_m$ to the leakage-inductance ($L_t$) holds true for the Ćuk converter when a large gap is introduced in the transformer. Remember that the transformer requires a very minimal gap. Having to increase the gap on the transformer to accommodate the DC-energy-storage, in the Ćuk integrated-magnetic device, greatly reduces the $L_m$ but it does not affect the $L_t$ proportionally. The resulting (or net) aiding and/or opposing inductances in the integrated-magnetic-device become highly dependent on the gap and $L_t$. When the gap and $L_t$ are relatively small, the resulting (or net) aiding and/or opposing inductance will follow the conventional inductance-formula based on the number of turns squared times the inductance-index ($A_L$). When the gap or $L_t$ are relatively large, the leakage-inductance overwhelms the net-number of turns and produces an uncontrollable effective-inductance that is highly dependent on the actual $L_t$ values. When the leakage-inductance/magnetizing-inductance ratio is unintentionally increased, the external circuitry, especially the complex-RLC relationships, is adversely affected and unexplainable problems develop.

In U.S. Pat. No. 5,642,267, issued to Brkovic and Ćuk, a complex, non-isolated, and relatively low-efficiency, DC-DC Ćuk-type-converter is presented with front-end passive power-factor-correction. The converter requires 5 switching devices to implement and does not include any integrated-magnetic elements. Marrero, in U.S. Pat. No. 5,786,990, discloses a complex DC-DC converter with electronic current-steering circuitry. Marrero's circuitry follows the form given in FIG. 3. In U.S. Pat. No. 5,815,380, issued to Ćuk et al, an isolated DC-DC converter is disclosed that claims open-loop control and elimination of the isolation-requirement for the control-circuitry. However, the disclosed circuit provides secondary-feedback to the isolated control-circuit via an isolating current-sense transformer. No integrated-magnetic elements are present and the topology follows the form depicted in FIG. 3.

The Motorola application note MC33368, *High Voltage Greenline™ Power Factor Controller*, provides good guidelines for designing front-end, non-isolated power-factor-correction (PFC) preregulators. The application note discusses the use of analog-multipliers and zero-crossing detectors. A general guide to power-factor-correction is given by Swiontek, in *Power Factor Correction*. Daniele et al, in *A Single-Stage Power-Factor-Corrected AC/DC Converter*, present a single-stage, double-ended, forward-converter that is typical of modern PFC preregulators. The complex topology features universal input-voltage and relatively low-efficiency. Palczynski, in Unitrode's application note DN-48, *Versatile Low Power SEPIC Converter Accepts Wide Input Voltage Range*, gives a good design reference for a non-isolated SEPIC preregulator. Andreycak, in Unitrode's application note U-132, *POWER FACTOR CORRECTION USING THE UC3852 CONTROLLED ON-TIME ZERO CURRENT SWITCHING TECHNIQUE*, describes a slightly complex PFC preregulator that avoids the analog square, multiply, and divide functions typically used in modern PFC-preregulators. Key features are the use of fixed on-time and ZCS. Application note U-132 and Todd, in Unitrode application note U-134, *UC3854 Controlled Power Factor Correction Circuit Design*, present very good design references that discuss many of the typical problems and design issues encountered in the design of PFC preregulators. Ortmeyer et al, in Unitrode's application note AN1214 *DESIGN TIPS FOR L6561 POWER FACTOR CORRECTION IN WIDE RANGE* define the complexity of providing PFC in a wide ranging power supply.

The development of ac/ac and DC/ac converters have followed similar paths as the ac/DC and DC/DC converters. An inverter is a power supply that converts DC power to ac power by the use of high-frequency switches. Fink in *Electronics Engineers' Handbook*, pages 15–33 to 15–42 discusses prior-art inverters. Two important uses, for an ac-output switching-converters, are for electronic lamp-ballasts and uninterruptible-power-supplies (UPS). The isolated-versions of these topologies generally follow the forms depicted in FIGS. 2 and 3. Both applications were originally developed using low-frequency (tens to hundreds of hertzs) iron-core transformers until the introduction of higher-frequency switching-technologies.

Two good basic references for electronic ballast design are Bairanzade's Motorola application note AN1049, *THE ELECTRONIC CONTROL OF FLUORESCENT LAMPS*, and Christiansen's *Basic Design Calculations for an Electronic Ballast PFC Circuit*. Jordan et al, in Unitrode's application note U-141 *Resonant Flourescent Lamper Converter Provides Efficient and Compact Solution* gives a good design reference for driving cold-cathode lamps. Fiorello, in Unitrode's application note U-161 *POWERING A 35 W DC METAL HALIDE HIGH INTENSITY DISCHARGE (HID) LAMP USING THE UCC3305 HID LAMP CONTROLLER* defines the guidelines for powering a HID lamp.

An early high-frequency-ballast was disclosed by Knoll, in U.S. Pat. No. 4,158,156. A key feature of this design was the transformer winding configuration that placed the primary-winding on the center-leg of an 'E' shaped-core and two secondary-output-windings on opposite outer-legs of the core. This transformer configuration resulted in a high leakage-inductance that provided independent ignition or starting of the lamps. This topology follows the form given in FIG. 3.

U.S. Pat. No. 4,538,095, issued to Nilssen, disclosed a complex double-ended, half-bridge series-resonant ballast. This topology fits the form ac/DC to DC/ac given in FIG. 2. U.S. Pat. No. 4,768,141, issued to Hubertus et al, disclosed a similarly complex, half-bridge electronic ballast. Nilssen, in U.S. Pat. No. 4,985,664, disclosed a non-isolated, electronic ballast with passive-PFC circuitry. In U.S. Pat. No. 5,214,355, Nilssen disclosed a half-bridge electronic ballast with a series combination of inductor, capacitor, and lamp. Auld et al, in U.S. Pat. No. 5,225,741, disclosed an extremely complex and non-isolated electronic ballast. Isolated and non-isolated, half-bridge, series-resonant, electronic-ballasts were disclosed in U.S. Pat. No. 5,424,614, issued to Maheshwari. Lai, in U.S. Pat. No. 5,246,350, gives a non-isolated, double-resonant LCLC high-frequency ballast that featured zero-voltage-switching (ZVS).

Figure 13:
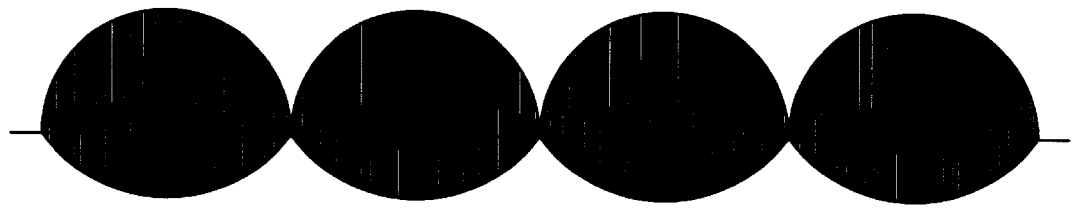
FIG. 13 is a highly exaggerated-perspective drawing showing the asymmetrical ac waveform that results from single-ended pulsed-DC excitation of prior art.

Konopka, in U.S. Pat. No. 5,453,665, disclosed a single-ended, DC/ac electronic-ballast with passive-PFC and energy storage for low-mains input brown-outs. This design highlights one of the drawbacks for a single-ended topology with ac-output. When a unipolar-excitation, such as pulsed-DC, is impressed across the transformer primary-winding, the resulting secondary-waveform will have a non-symmetrical waveshape. FIG. 13 depicts a highly exaggerated asymmetry in the ac-output waveshape for a single-ended topology. The waveform shown in FIG. 13 is exaggerated to highlight the asymmetry. In an electronic-ballast, even a very low asymmetrical-polarization will seriously degrade the lamp reliability (life). Despite its lower cost, unipolar-polarization has prevented the acceptance of single-ended topologies in the electronic ballast market. This single-ended topology follows the form depicted in FIG. 2.

In U.S. Pat. No. 5,510,680, issued to Nilssen, an extremely complex, dual half-bridge topology is given. The first half-bridge stage forms the front-end active-PFC pre-regulator and the second half-bridge stage provides the isolated output. This unit takes the form given in FIG. 3. Lee et al, in U.S. Pat. No. 5,546,300, disclosed a double-ended, non-isolated, resonant ballast with ZVS. U.S. Pat. No. 5,969,484, issued to Santi, Zhang, and Ćuk, discloses an extremely complex, non-isolated Ćuk-type front-end PFC-preregulator that feeds a complex unfolding-stage that reconstitutes the ac output-waveform. It appears that it would require an unfolding-stage for each additional lamp. This converter follows the well-known topology shown by Kassakian et al, in 1991, on page 181. No integrated-magnetics are used in the Ćuk stage. The topology follows the form given in FIG. 2.

Alonso et al present an extremely complex, non-isolated, full-bridge, series-parallel-mode resonant electronic ballast in *Analysis, Design, and Optimization of the LCC Resonant Inverter as a High-Intensity Discharge Lamp Ballast*. The key feature is optimum commutations of the reactive energy and the resulting minimization of switching and conduction losses. Qian and Lee, in *Charge Pump Power-Factor-Correction Dimming Electronic Ballast*, present a complex, non-isolated half-bridge charge-pump ballast design with passive-capacitor-PFC. A key feature is lamp dimming over the range of 20% to 100%.

In U.S. Pat. No. 5,513,088, I disclosed an uninterruptible-power-supply (UPS) system with universal-input voltage-range and an energy-recovery circuit that captures the transformer's counter-emf to power the control circuitry. Two key UPS classifications are isolated and non-isolated. A true UPS system provides protection at all times whereas a standby-power-supply allows power brown-out or drop-out periods that typically last a few milliseconds. The off-line UPS is usually either a flyback, forward, push-pull, half-bridge, or fall-bridge topology. Traditionally, switch-mode UPS systems will also follow the format given in FIG. 2.

Most motor-control applications are dominated by DC-motors and their complex and expensive DC motor-controllers. Maiocchi, in Unitrode application note AN2810 *DRIVING DC MOTORS*, gives an overview of the DC-motor drive requirements. DC-motors are larger, heavier, and more expensive than ac-motors of equivalent horsepower. An ac motor-controller is more complex and costly than its DC-equivalent. Fitzgerald et al, in *BASIC ELECTRICAL ENGINEERING*, pages 714–719 outline the salient problems and design methods for controlling ac-motors. Arrigo, in Unitrode application note AN1088 L6234 *THREE PHASE MOTOR DRIVE*, gives an overview of the general design parameters for driving an ac-motor. There are four basic methods of speed-control for ac-motors but only variable-frequency-control can deliver the performance-characteristics obtainable with DC motor-control. The problem has been that cost-effective variable-frequency ac motor-controllers do not exist. Baker, in *Making motor-control circuits smaller, cheaper, better*, outlines the typical design constraints that presently restrict ac-motor controls. Variable-frequency ac motor-control normally follows the form of FIG. 2.

OBJECTS AND ADVANTAGES

Accordingly, the following list details many of the objects and advantages of this invention:

(a) a new method and apparatus for direct conversion from an ac waveform of specified voltage, current, frequency, and/or phase to another ac waveform of different voltage, current, frequency, and/or phase;

(b) the new method and apparatus operate with a single high-frequency switch and a single truly integrated-magnetic-element with negligible DC energy-storage;

(c) the new method and apparatus can easily be adapted to perform DC to ac inversion or ac to DC conversion;

(d) the new method and apparatus deliver the highest energy-density, highest efficiency, smallest size, and lowest-cost relative to prior-art switching-power-supply technologies;

(e) the new method and apparatus has an inherent near unity power factor that eliminates the need for a separate power-factor-correction (PFC) circuitry thus eliminating the need for zero-crossing-detectors, analog-mathematical-functions, and other complex control circuits;

(f) in a lamp ballast application, the new method and apparatus have an inherent lamp dimming characteristics from 0% to orders of magnitude beyond the safe upper limit of 120%; further, this inherent control-feature can serve as a motor-speed control;

(g) the new method and apparatus can operate over a very-large range of input voltage and/or mains (line) frequency, as appropriate;

(h) in a fixed-load and line-voltage application, such as a lamp ballast, the new method and apparatus can be operated open-loop and maintain excellent load-regulation at the output;

(i) the new method and apparatus can maintain excellent line-regulation, with a wide input voltage range, with simple feedforward compensation, further, the input mains can be single or multiple phase ac;

(j) the new method and apparatus provide transformer-isolation between the input and output or can be operated without transformer isolation;

(k) the new method and apparatus are a buck-boost topology thus the output can be higher than, equal to, or lower than the input;

(l) the new method and apparatus do not develop a RHP-zero in the control-to-output control function;

(m) the new method and apparatus operate with all prior-art regulation and feedback techniques, such as but not limited to, open-loop, closed-loop, pulse-width-modulation (PWM), current-mode, duty-ratio mode, feedforward, ZCS, ZVS, fixed duty-cycle and variable-frequency, fixed-on-time and variable off-time, fixed-off-time and variable on-time;

(n) the new method and apparatus can operate with integrated-magnetic elements or discrete-magnetic elements;

(o) the new method and apparatus does not require current-steering to keep the input and output ripple low;

(p) the new method and apparatus virtually eliminate DC energy-storage in all magnetic-elements thus achieving the advantage of the small-size typically gained from very-high-frequency operation but at modest operating-frequencies, further, allows the use of uniform (equal) gapping, still further, the energy-storage function is performed by lower-cost capacitors;

(q) the new method and apparatus avoid DC or unipolar-excitation in the primary and secondary circuits;

(r) the new method and apparatus achieve excellent reliability by lowering the stress and power-dissipation in the components; reducing the number of high-frequency-switches; and eliminating the need for large aluminum-electrolytic-capacitors on the input and output;

(s) the new method and apparatus can provide temperature-compensation of the output voltage, current, frequency, and/or phase, for applications such as, but not limited to, lamp ballasts and battery chargers;

(t) the new method and apparatus minimizes the development of EMI through the use of sinusoidal waveforms and ZCS, further, the sinusoidal waveforms and ZCS allow the high-frequency switches to be operated at higher-frequencies than typical DC-based technologies;

(u) the new method and apparatus have a combined start-up, snubber, and energy-recovery circuit that improves the system efficiency, simplifies the circuitry, and lowers the cost;

(v) the converter is primarily a single-ended resonant converter but can easily be modified for double-ended resonant operation; the outputs of the converter can be paralleled or ganged-together to multiply the output power for large-power applications; and the outputs are hot-pluggable;

Further objects and advantages of the invention will become apparent from a consideration of the drawings and description that follows.

| LIST OF REFERENCE NUMERALS | |
|---|---|
| 1 | INTEGRATED-MAGNETIC-ELEMENT |
| 1a | INPUT-INDUCTOR |
| 1b | OUTPUT-INDUCTOR |
| 1c | TRANSFORMER |
| 2 | CAPACITOR |
| 3 | CAPACITOR |
| 4 | SWITCH |
| 5 | FULL-WAVE-RECTIFIER |
| 5a | DIODE |
| 5b | DIODE |
| 5c | DIODE |
| 5d | DIODE |
| 6 | RESISTOR |
| 7 | RESISTOR |
| 8 | CAPACITOR |
| 9 | CAPACITOR |
| 10 | REGULATOR |
| 11 | COUPLING-INDUCTOR |
| 11a | INDUCTOR |
| 11b | INDUCTOR |
| 11c | INDUCTOR |
| 12 | DIODE |
| 13 | FULL-WAVE-RECTIFIER |
| 14 | CAPACITOR |
| 15 | INPUT-INDUCTOR |
| 16 | OUTPUT-INDUCTOR |
| 17 | TRANSFORMER |
| 18 | INDUCTOR |
| 50 | SYSTEM |
| 51 | SYSTEM |
| 52 | SYSTEM |
| 53 | SUBSYSTEM |
| 58 | SYSTEM |
| 59 | SYSTEM |
| 60 | SYSTEM |

SUMMARY OF THE INVENTION

A new method and apparatus are presented that greatly simplifies the existing complex off-line converter and inverter technologies. Versus existing technologies, the invention offers the lowest cost, smallest-size, lowest weight, highest-efficiency, lowest EMI generation, highest energy-density, and inherent near-unity power-factor. This method can be applied to a very broad range of applications in the field of power conversion including, but not limited to, battery-charging, wall-adapters, electronic-ballasts, HID, ac-motor-control, DC-motor-control, hot-plug distributed power supplies, and UPS systems. The greatest benefit of this invention will be the environmental and economic impact that results from the energy reduction made possible by the regulated output, 92% to 96% efficiency, and the inherent near-unity power factor. The low-cost advantages will make it financially beneficial for industry and consumers to take advantage of the environmental and energy-saving benefits. The technology can be applied to an off-line 5-watt battery-charger, as well as, multi-megawatt 3-phase ac/DC power supplies for motors and large industrial plants. The higher power can be accommodated because of the converter's ability to parallel outputs and hot-plug the outputs together without any down-time. A number of unexpected benefits, among others, include the elimination of essential elements from existing technology and the low cost and simplicity of the electronic circuitry needed to provide these benefits. In many applications the supply can be operated open-loop with just a simple timer, such as a 555-timer, to control the duty-cycle. The invention optimizes the small-size of the magnetic and capacitive elements while operating at modest switching-frequencies by avoiding any DC-energy-storage in the magnetic elements. Energy-storage is done with much cheaper capacitive elements. The most unexpected benefit was the realization that the simpler the technology becomes, the wider the application base will be. This invention will have unparalleled environmental and energy-saving impacts.

DESCRIPTION OF THE PREFERRED EMBODIMENTS

Figure 1A:
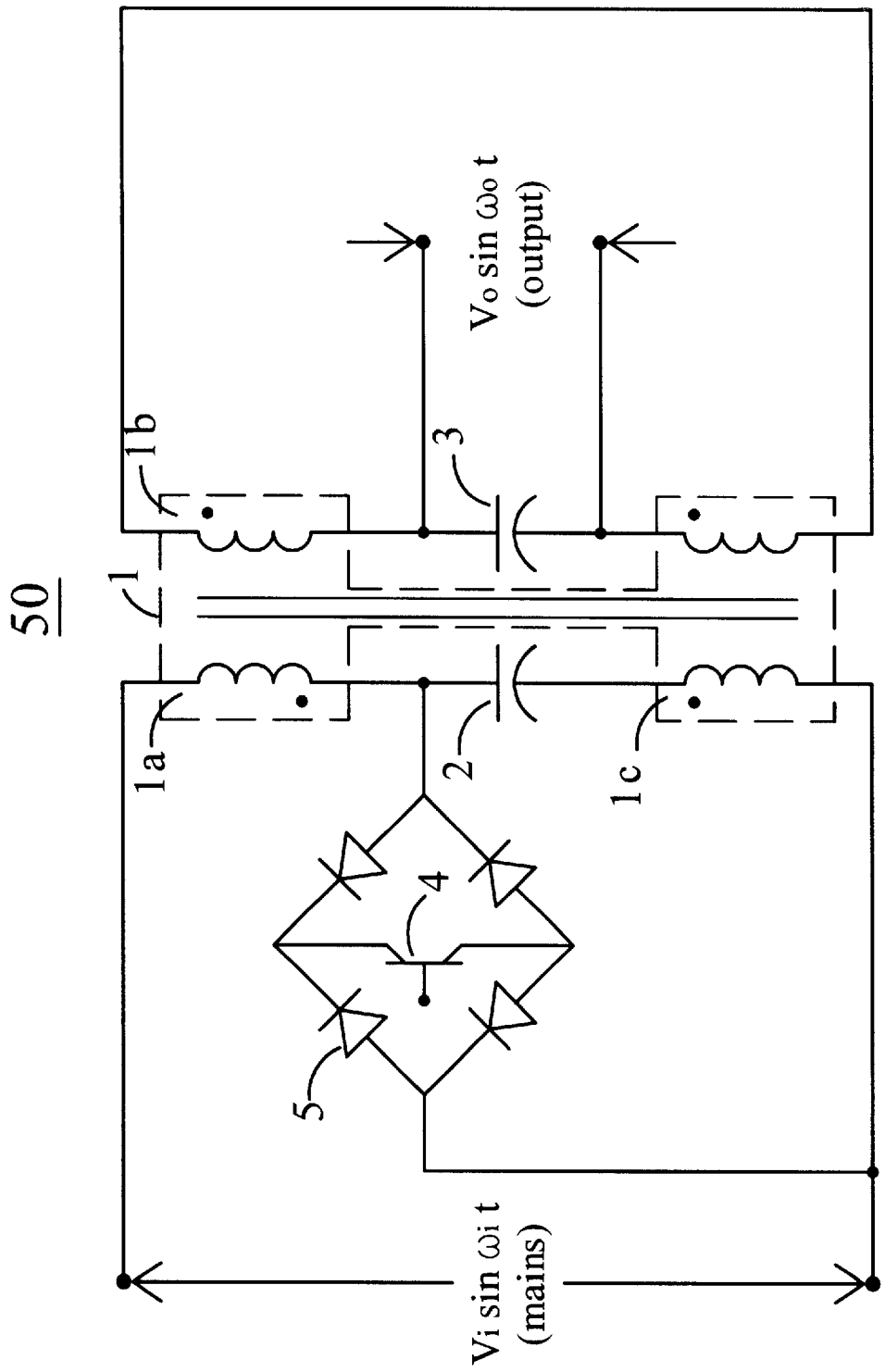
FIG. 1A is a simplified-schematic-diagram of the preferred ac/ac embodiment of the invention.
Figure 1B:
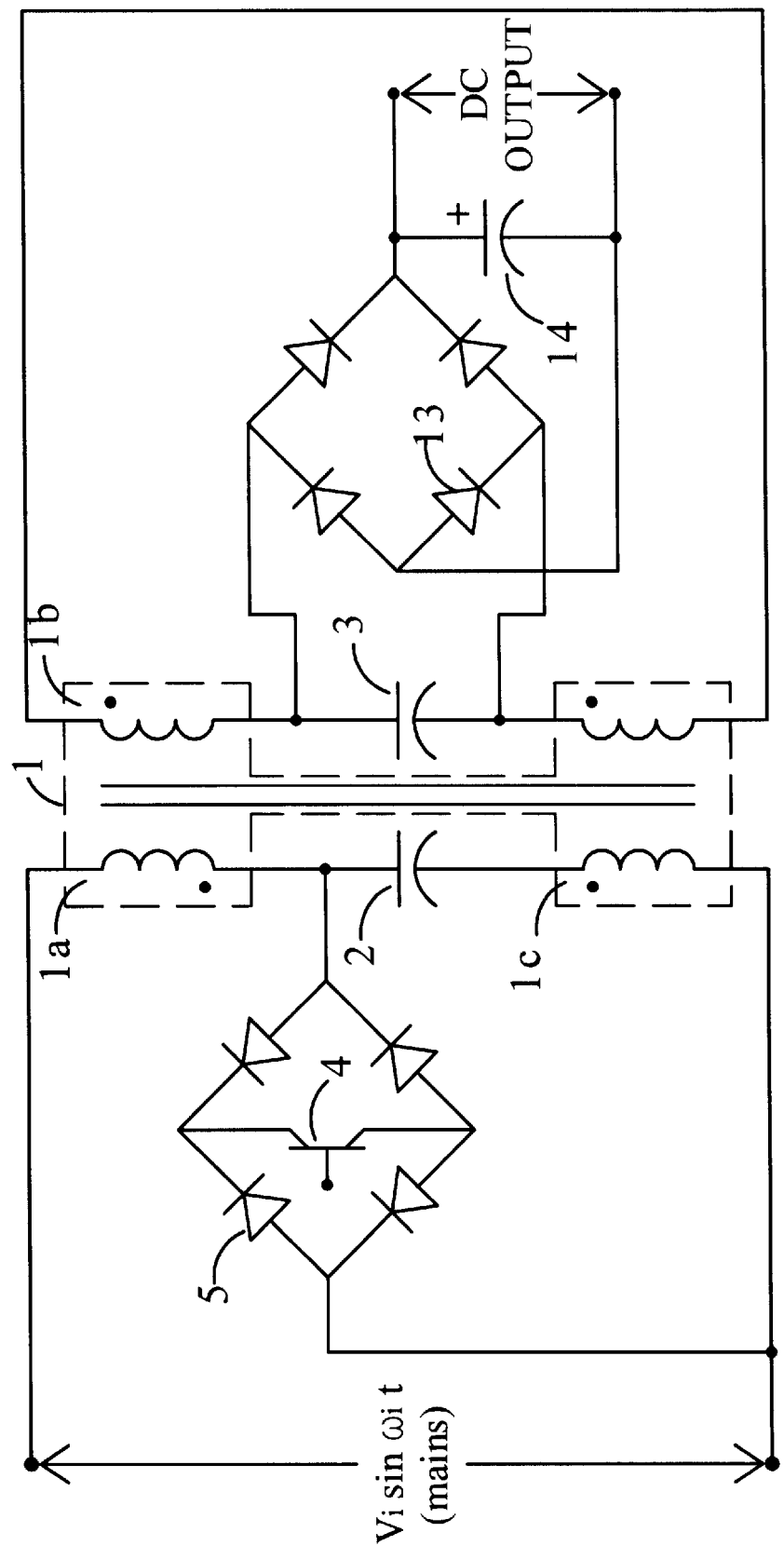
FIG. 1B is a simplified-schematic-diagram of an alternative ac/DC embodiment of the invention.
Figure 1C:
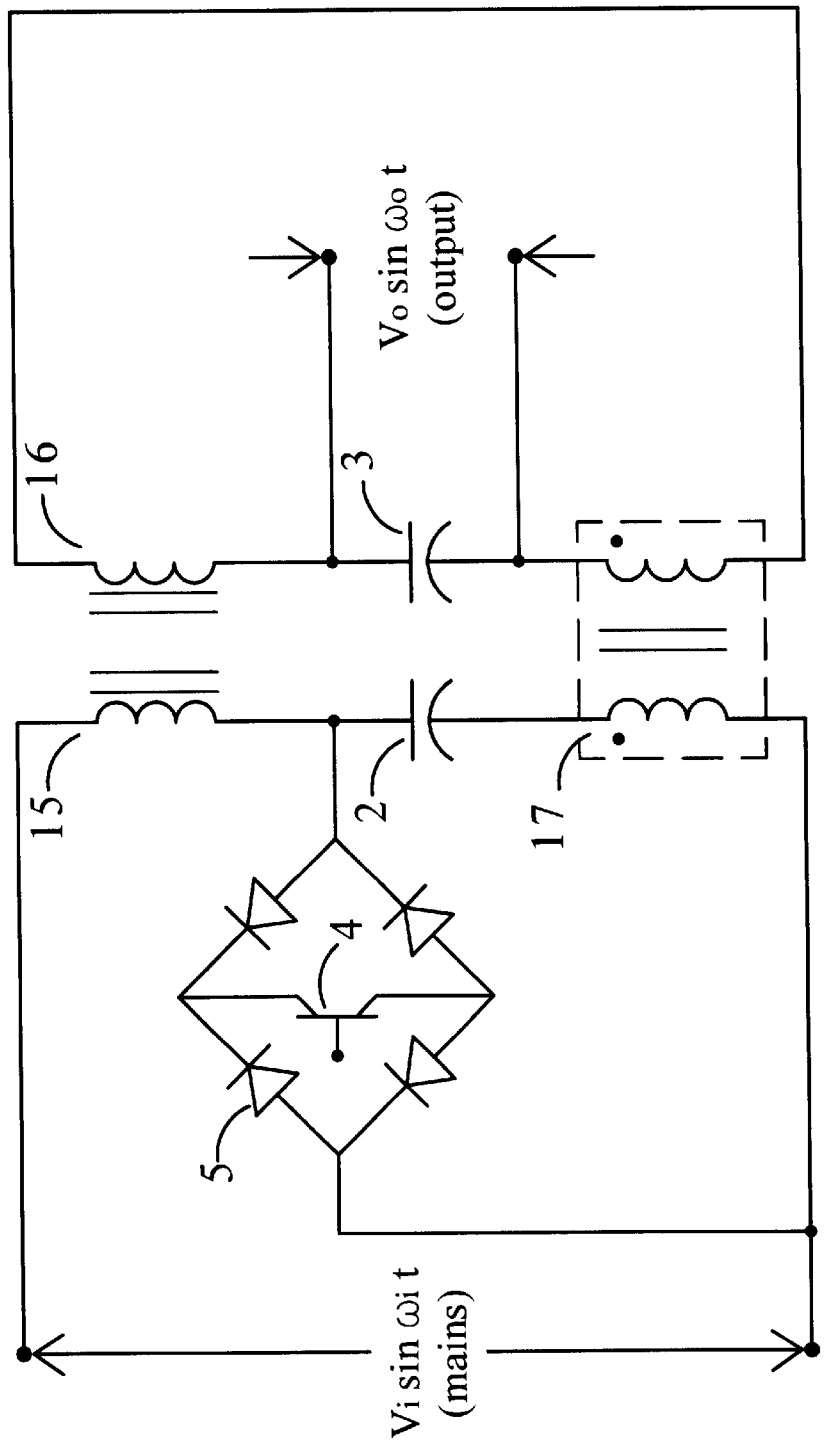
FIG. 1C is a simplified-schematic-diagram of an alternative ac/ac embodiment of the invention utilizing discrete inductive elements.
Figure 15:
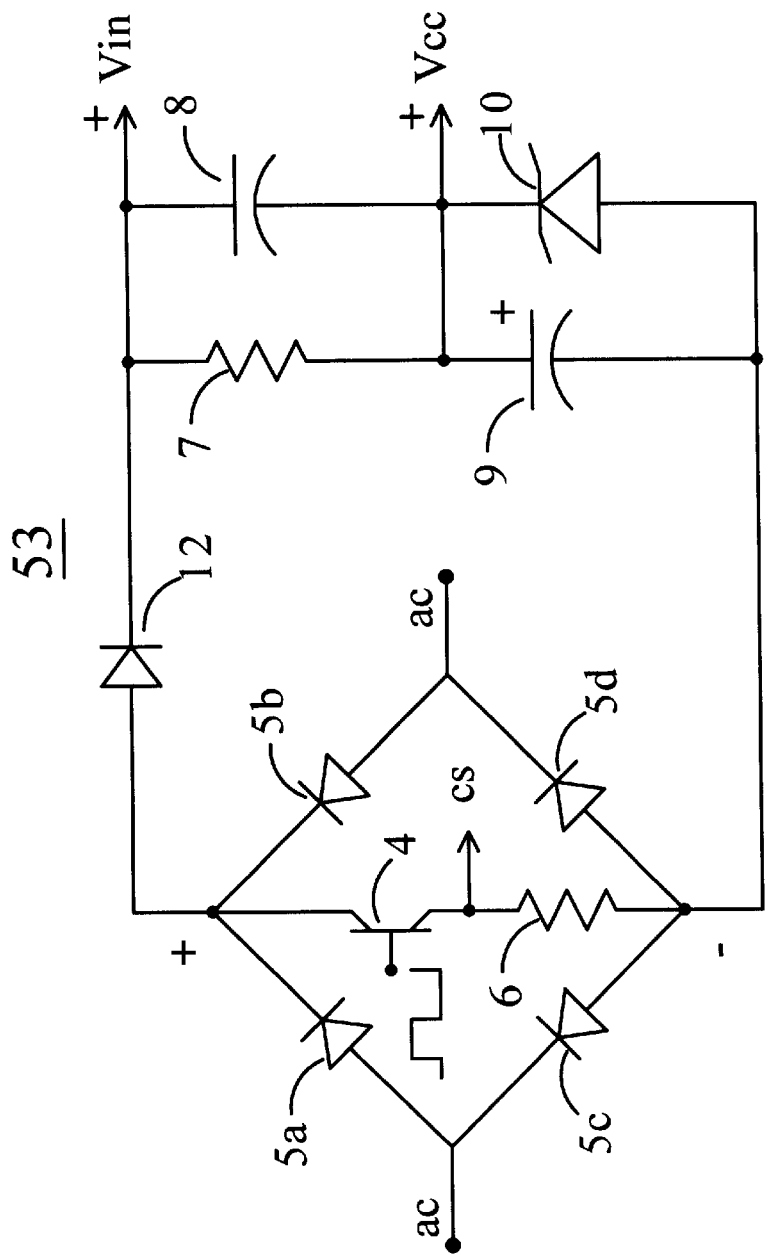
FIG. 15 is a simplified-schematic-diagram showing the essential elements of the combined start-up, snubber, and energy-recovery circuitry of the invention.

FIGS. 1A, 1B, 1C, 11A and 11B illustrate the various embodiments of the invention. FIG. 1A details the simplified schematic-diagram of system 50. FIGS. 1B and 1C illustrate alternative systems 58 and 59. System 50 consists of integrated-magnetic-element 1, capacitor 2, capacitor 3, switch 4, and full-wave-rectifier 5. Integrated-magnetic-element 1 consists of input-inductor 1a, output-inductor 1b, and transformer 1c. Input-inductor 1a and output-inductor 1b are configured to operate as coupling-inductors and are wounded on opposite outer-legs of the core. Transformer 1c is wound on the center-leg of the core. Capacitor 2 is configured to serve as the main energy-storage element on the primary-side or input of the circuit. Input-inductor 1a provides charge to capacitor 2 when switch 4 is off. When switch 4 is on, capacitor 2 provides energy to the primary-winding of transformer 1c. Input-inductor 1a and the primary-winding of transformer 1c are configured such that the windings oppose each other. Full-wave-rectifier 5 is placed directly around switch 4 as opposed to the traditional placement between the input ac and the electronic circuitry. This unique placement allows the ac input to be directly connected to the primary of integrated-magnetic-element 1 while ensuring that DC-polarization is maintained for switch 4. When switch 4 is non-conducting, the mains or line input is impressed across the LC circuit formed from capacitor 2 and the combined-inductance (opposing) of input-inductor 1a and the primary winding of transformer 1c. Capacitor 3 serves as the output of the circuit and the load circuitry is connected in parallel with capacitor 3. Output-inductor 1b and the secondary-winding of transformer 1c are configured such that the windings aid each other. Capacitor 3 plus the combined (aiding) inductance of output-inductor 1b and the secondary winding of transformer 1c form a LC resonant-circuit. The input circuitry can be a single-input or a plurality of inputs to match the input power source, such as single-phase or 3-phase. The output circuitry can be a single-output or a plurality of outputs, as appropriate. Capacitor 2, capacitor 3, switch 4, and full-wave-rectifier 5 can individually be single components or a plurality of components as needed to match the power, voltage, and current requirements for safe and reliable operation. Capacitor 2 and capacitor 3 will typically be polypropylene or metallized-polypropylene film capacitors chosen to match the high-frequency ac-current requirements. Switch 4 can be any switch suitable for the application, such as a transistor, MOSFET, or IGBT. Full-wave-rectifier 5 can be a single full-wave-rectifier, as shown in FIG. 1A, or configured individually as diode 5a, diode 5b, diode 5c, and diode 5d, as shown in FIG. 15.

System 58, shown in FIG. 1B, shows an ac to DC configuration with the addition of full-wave-rectifier 13 and capacitor 14. System 59, shown in FIG. 1C, shows the implementation of an ac to ac configuration with discrete magnetic elements input-inductor 15, output-inductor 16, and transformer 17.

Figure 11A:
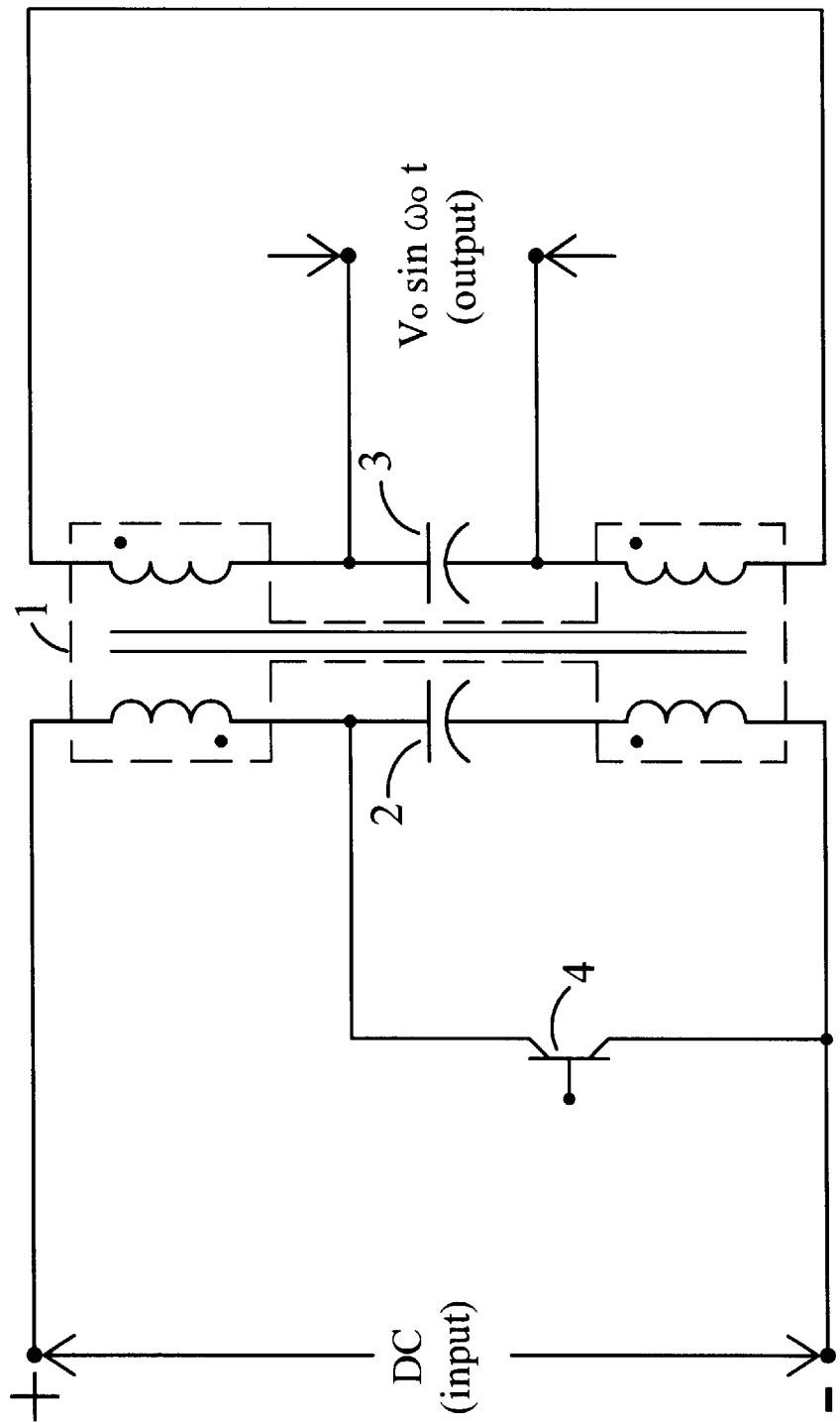
FIG. 11A is a simplified-schematic-diagram showing an alternate-embodiment of a DC/ac converter.
Figure 11B:
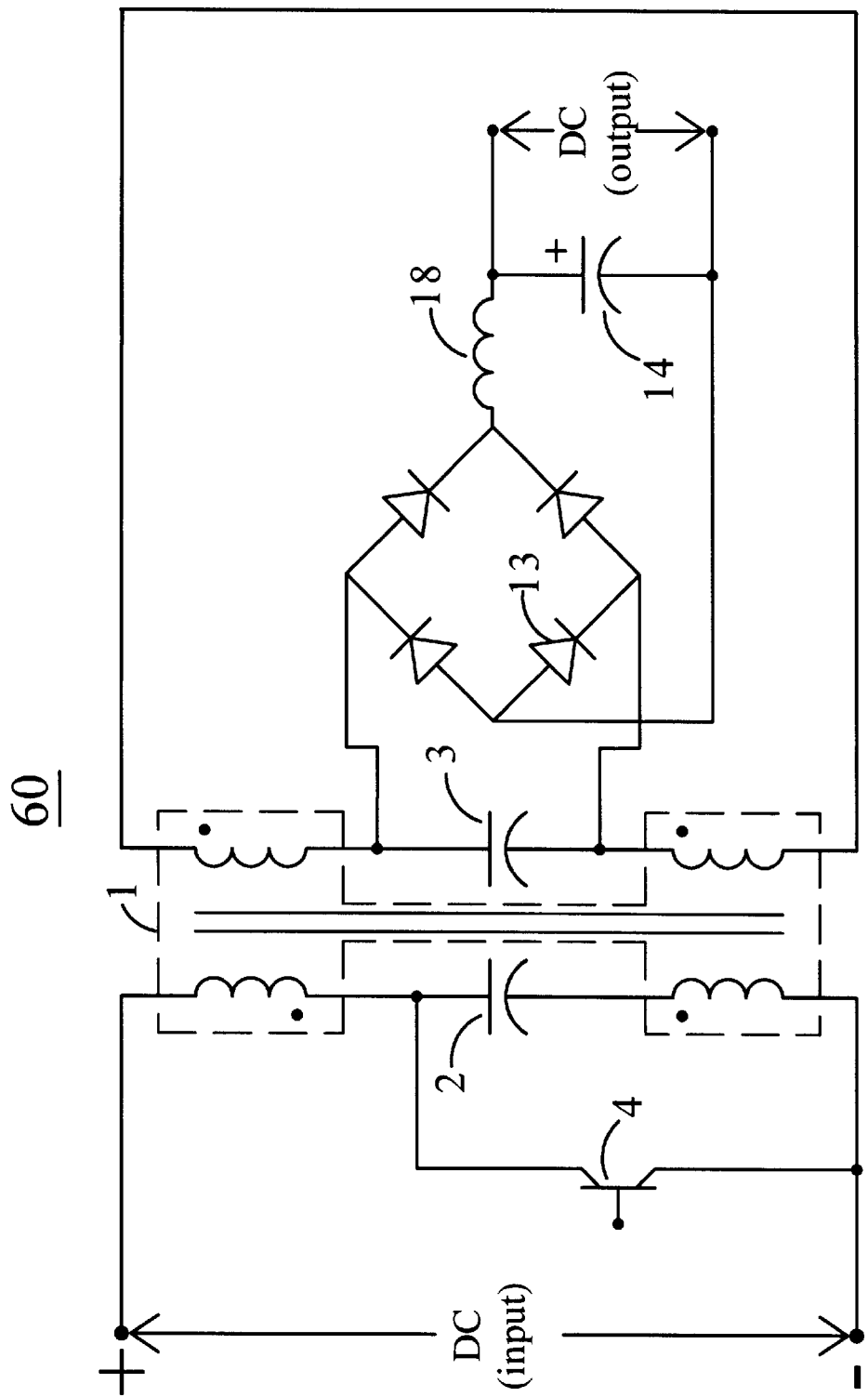
FIG. 11B is a simplified-schematic-diagram showing the essential elements of an alternate-embodiment of a DC/DC converter.

System 51, in FIG. 11A, consists of integrated-magnetic-element 1, capacitor 2, capacitor 3, and switch 4. System 51 substantially provides the same ac output as system 50, shown in FIG. 1A, but has a DC or rectified ac input. Integrated-magnetic-element 1, capacitor 2, capacitor 3, and switch 4 substantially function as described in system 50 except the ac input (mains) is not directly connected to integrated-magnetic-element 1. System 60, given in FIG. 11B, describes a DC to DC configuration, which includes full-wave-rectifier 13, inductor 18, and capacitor 14.

Figure 12:
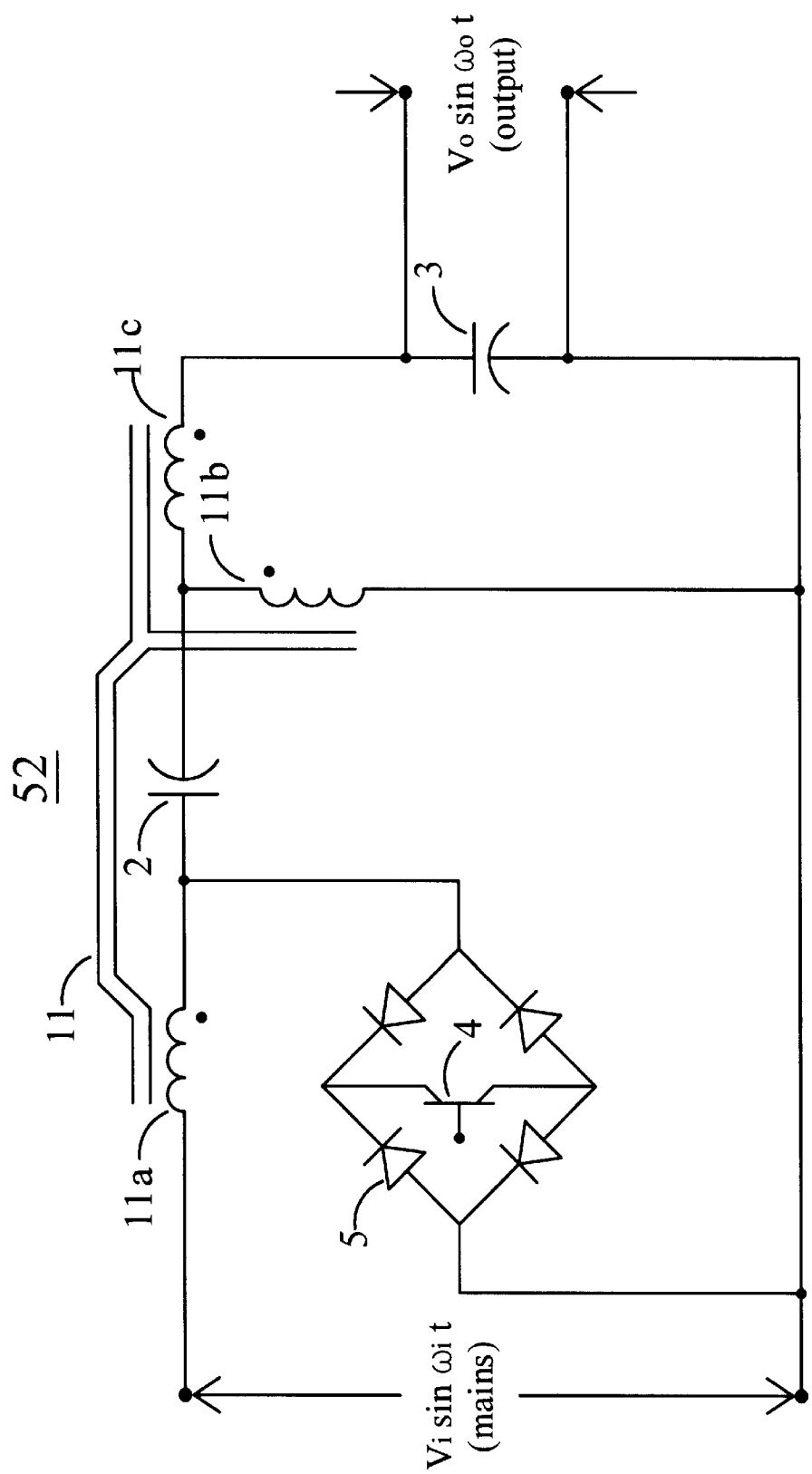
FIG. 12 is a simplified-schematic diagram showing the essential elements of an alternate-embodiment of a non-isolated ac/ac converter.

FIG. 12 illustrates an alternate embodiment for a non-isolated implementation of this invention. The non-isolated version can be used as a PFC-preregulator for the isolated version in very high-power applications. System 52 consists of capacitor 2, capacitor 3, switch 4, full-wave-rectifier 5, and coupling-inductor 11. System 52 substantially performs the same function as system 50 or system 51 but without the transformer-isolation. Coupling-inductor 11 consists of inductor 11a, inductor 11b, and inductor 11c. Inductor 11a serves as the input-inductor. Inductor 11b and inductor 11c form the output inductor function. Inductor 11b and inductor 11c are configured as a single tapped-inductor. Inductor 11b will be typically wound with the majority of the turns of wire so that the inductance of inductor 11b is much greater than the inductance of inductor 11c. This tapped-inductor configuration improves the energy-transfer-ratio between capacitor 2 and capacitor 3. Inductor 11c is optional at the sacrifice of performance and size.

FIG. 15 illustrates the optional combined start-up, snubber, and energy-recovery circuit. Subsystem 53 consists of switch 4, diode 5a, diode 5b, diode 5c, diode 5d, resistor 6, resistor 7, capacitor 8, capacitor 9, and regulator 10. Switch 4 is substantially as described in system 50. Diode 5a, diode 5b, diode 5c, and diode 5d can be discrete diodes or a single full-wave-rectifier as shown in FIG. 1A. Resistor 6 is a current-sense resistor and is connected in series with switch 4 to sense the switch-current. Alternately, a current-sense transformer can be substituted for resistor 6. Resistor 6 can be a single-resistor or a plurality of resistors as necessary to match the application. Diode 12 allows current to flow into resistor 7, capacitor 8, and to a conventional input-voltage monitoring circuit (not shown). Diode 12 also prevents switch 4 from discharging capacitor 9 when it is conducting. The Vin voltage is optionally used by the control circuit, as needed, but it mainly provides the voltage feed-forward signal. Resistor 7 is the start-up resistor and the snubber resistor for switch 4. Resistor 7 can be a single-resistor or a plurality of resistors as necessary to match the application. Capacitor 8 is connected in parallel to resistor 7. At the lower line or mains frequency, capacitor 8 is a high-impedance, relative to resistor 7, and resistor 7 essentially controls the charging of capacitor 9 during start-up. At the higher-operating-switching-frequency, capacitor 8 develops a low-impedance, relative to resistor 7, and passes any counter-emf, developed by switch 4, to charge capacitor 9 (the energy-recovery function). Capacitor 8 thereby provides the snubbing-function for switch 4. Resistor 7 also discharges capacitor 8 to maintain the proper voltage level across capacitor 8 for its snubbing function. Capacitor 9 is the main energy-storage capacitor for the Vcc operating supply. Capacitor 8 and capacitor 9 form a capacitor-divider circuit. Capacitor 8 and capacitor 9 can be single capacitors or a plurality of capacitors as necessary to match the application. Capacitor 8 may be a small polyester film or ceramic capacitor as needed for the application. Capacitor 9 will generally be a small aluminum-electrolytic capacitor of sufficient size to maintain the needed filtering for the low milliamperes required to power the Vcc regulator. Regulator 10 regulates the Vcc voltage used to power the control circuitry and can be any suitable regulator for the application, such as a zener-diode. Regulator 10 can be a single-regulator or a plurality of regulators as necessary.

OPERATION OF INVENTION—PREFERRED EMBODIMENTS

The preferred-embodiment for the invention is given in FIG. 1A as system 50. The preferred embodiment is marketed under the ZAE Research, Inc. trademark Occam converter-technology. The salient features are direct ac-to-ac conversion; a single-high-frequency-switch; a single, truly-integrated-magnetic-structure; an ac-excitation with a single-ended topology; and the direct application of the ac-input to the primary-circuit. The most obvious topology change is the elimination of the traditional ac-to-DC input-stage, DC energy-storage link, and DC-to-ac output-stage. A critical but less obvious difference is that energy-storage occurs in the capacitors rather than the inductors.

The Ćuk and SEPIC converters have a primary-topology that appears to be similar to the invention but the elimination of the secondary-switch(s) (output-diode(s)) dramatically changes the basic operating characteristics. The key topology difference is the elimination of essential-elements from the Ćuk and SEPIC topologies. In the Ćuk and SEPIC topologies, when the primary switch is conducting, the output-diode is reversed-biased and it blocks the flow of current in the secondary. This out-of-phase operation of the primary and secondary switches requires the DC-energy to be stored in the input-inductor and transformer when the primary-switch is conducting and the stored DC-energy is then delivered when the secondary-switch begins conducting.

Referring to system 50 in FIG. 1A, when switch 4 is conducting, the energy stored in capacitor 2 is immediately delivered to the secondary via the primary winding of transformer 1c. This subtle operating-characteristic allows the design of a single, truly-optimized integrated-magnetic-element 1. As stated, input-inductor 1a and the primary of transformer 1c form a series-opposing-inductor. The function of the series-opposing-inductor is to control the charge of capacitor 2 when switch 4 is non-conducting. At the line-frequency (typically tens to hundreds of Hz) input-inductor 1a will have a low-impedance and allow rapid charging of capacitor 2. At the switching-frequency (typically tens to hundreds of kHz or even MHz) the impedance of input-inductor 1a will be significantly higher and will contribute very little current when switch 4 is conducting. Negligible energy will be stored in input-inductor 1a when switch 4 is conducting.

When the ac input is positive with respect to input-inductor 1a and negative with respect to the primary of transformer 1c, capacitor 2 will be charged with a positive-polarization with respect to full-wave-rectifier 5. When the ac input reverses, the polarization of charge on capacitor 2 will become negative with respect to full-wave-rectifier 5. Full-wave-rectifier 5 maintains the proper polarization for reliable operation of switch 4 regardless of the polarization across capacitor 2. Except for its unique location, full-wave-rectifier 5 operates similarly to traditional full-wave rectification circuits. This unique topology ensures full ac-excitation of the primary-circuitry, except for switch 4. The ac-excitation (and avoidance of DC) allows integrated-magnetic-element 1 to be optimally designed for small-size and efficiency at very modest switching frequencies. Without any DC-excitation, such as found in older topologies, the unipolar-DC switching-currents are avoided and the switching and conduction losses in switch 4 are negligible. The EMI generated by the traditional DC-switching-current is also essentially eliminated.

Figure 14:
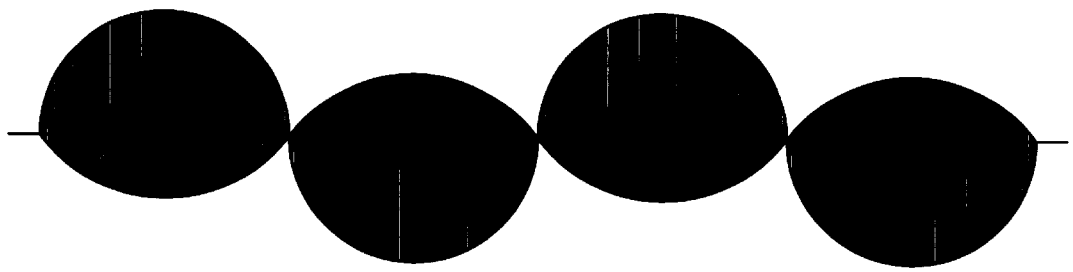
FIG. 14 is a highly exaggerated-perspective drawing showing the symmetrical ac waveform that results from single-ended ac excitation.

This unique topology also overcomes the asymmetrical output associated with single-ended pulsed-DC excitation as depicted in FIG. 13. The ac-excitation of the new topology will balance any asymmetry as shown in FIG. 14. The non-symmetry is highly exaggerated in FIGS. 13 and 14 for clarity. The invention can be easily designed for double-ended resonant operation to control the non-symmetry, as needed. The non-isolated version can be used to power the single-ended resonant circuit plus multiple units can be connected in parallel to boost the output power.

The voltage (or ampere) rms value of a full sine-wave is 0.707 times the peak value. The secondary of this single-ended-resonant converter operates from a half-sine-wave. The time period (T) of the full-cycle is equal to the inverse of the frequency (T=1/f). The period that the power is applied is the on-time ($t_{on}$) and the off-time ($t_{off}$) is the period that no energy is transferred from the primary. The total period (T) is equal to the on-time ($t_{on}$) plus the off-time ($t_{off}$). The rms voltage (V) or ampere (A) value of the half-sine-wave is determined by the formula $$V(A)_{rms} = V(A)_{peak} \sqrt{\frac{t_{on}}{2T}}$$

The rms value of the output voltage or current is controllable by varying the duty-cycle of the total period (T). The preferred method of control is a fixed on-time and a variable off-time. The fixed on-time allows the circuit to be tuned for zero-current-switching (ZCS). The ZCS greatly reduces the switching-losses and the EMI generated. A variable switching-frequency ($f_s$) can be used as a control-technique for applications, such as motor-speed control and electronic-ballast operation. As stated earlier, any control-mode or technique can be used. Input-voltage feedforward-compensation is especially valuable when designing for a wide-input voltage range. The off-time ($t_{off}$) can be modulated based on the value of the input-voltage, providing excellent line-regulation. Current-control can be modified to modulate the off-time based on switch 4's current level. A note of caution on the variable off-time, if the minimum off-time is too short compared with the on-time, a volt-second- or ampere-second-imbalance can be created in the transformer. For example, the invention can provide excellent regulation for multiple flourescent-lamps without any secondary or load feedback using just an industry-standard '555' timer, voltage feedforward-compensation, and current-regulation.

Kassakian et al, in pages 228 to 230, contrast the classic single-ended-resonant with DC-excitation with the quasi-resonant DC/DC converter. The invention avoids the DC-excitation of the single-ended-resonant plus avoids the circuit complexity of the DC-excited quasi-resonant converter.

Referring back to FIG. 1A, when switch 4 is conducting, capacitor 2 is connected in parallel to the primary of transformer 1c. Energy is immediately transferred to the secondary of transformer 1c in the form of a half-sine-wave-current. As stated, inductor 1b and the secondary winding of transformer 1c form a series-aiding inductor. The series-aiding inductor and capacitor 3 form a series-resonant LC circuit. When switch 4 is conducting, an ac-resonance is started in the secondary circuit that continues after switch 4 stops conducting. The resonant-circuit supplies the energy to provide a complete, full-sine-wave output when switch 4 stops conducting. This portion of the waveform will follow a slightly damped-sinusoidal shape that results in some asymmetry of the ac-waveform. The degree of non-symmetry is dependent on the care and selection of the circuit components. The degree of the asymmetry also depends on the Q of the resonant-circuit and the degree of damping.

The Q of a conventional series-resonant circuit follows the equation:

$$Q = \frac{X_L}{R} = \frac{1}{R}\sqrt{\frac{L}{C}}$$

When the load is connected in parallel with capacitor 3, the series-resonant circuit is modified by the location of the load ($R_L$). The output is connected directly parallel with capacitor 3 to minimize the harmonic distortion in the output voltage or current. A brief discussion of the harmonic distortion-reduction, with DC-excitation, is given by Kassakian et al on page 221. The comment about the possibility of a DC component on the capacitor is only true with DC-excitation.

The series-aiding $$Q = \frac{X_L}{R_L // X_c} = \frac{X_L}{\left(\frac{R_L X_C}{\sqrt{(R_L)^2 + (X_c)^2}}\right)}$$

inductors feed the parallel combination of capacitor 3 and the load so the secondary-circuit Q is therefore dependent on this parallel-impedance $R_L//X_C$. Therefore, the location of the load with respect to capacitor 3 changes the equation for calculating the secondary-circuit Q as follows:
The secondary-circuit Q is very important because of its effect on the resonant rise-of-voltage ($V_r$) per the equation Vr=QE With E representing the emf source-voltage generated by the secondary winding of transformer 1c. Therefore, the voltage expressed across the resonant-circuit is equal to Q times the output voltage of transformer 1c. Kassakian et al briefly discuss the Q-factors on pages 197 to 208.

The effect of Q can be significant in certain applications, such as electronic ballasts. The name electronic-ballast implies that the output-circuitry must provide a ballast-function for regulating the current through the lamps. This restraint is easily overcome by ensuring that the impedance ratios between the inductor, capacitor, and load are matched to ensure that the output-RLC-circuit remains essentially inductive at the frequencies of interest.

Clearly, besides the electronic ballast application, the variable ac output, shown in FIGS. 1A, 1C, 11A, and 12, can be used in UPS and ac-motor applications. Multiple inputs and outputs can be appropriately applied to FIGS. 1A, 11B, 1C, 11A, 11B, and 12 to provide the needed multiple input or output configurations. The DC outputs in FIGS. 1B and 11B can be configured for +/− voltages as well as multiple outputs.

The design of integrated-magnetic-element 1 is straight-forward and easy but there are some tricks to prevent unexpected and confusing problems. The first issue is to remember that there is no appreciable or desired DC-energy-storage in the core, so keep the transformer as a true-transformer by keeping the gap small. Increasing the gap to control the inductances values will decrease the inductance values BUT it will not reduce the leakage inductance associated with each winding. The uncontrolled leakage-inductances will defeat the desired series-resonant operation of the external circuitry.

Figure 16A:
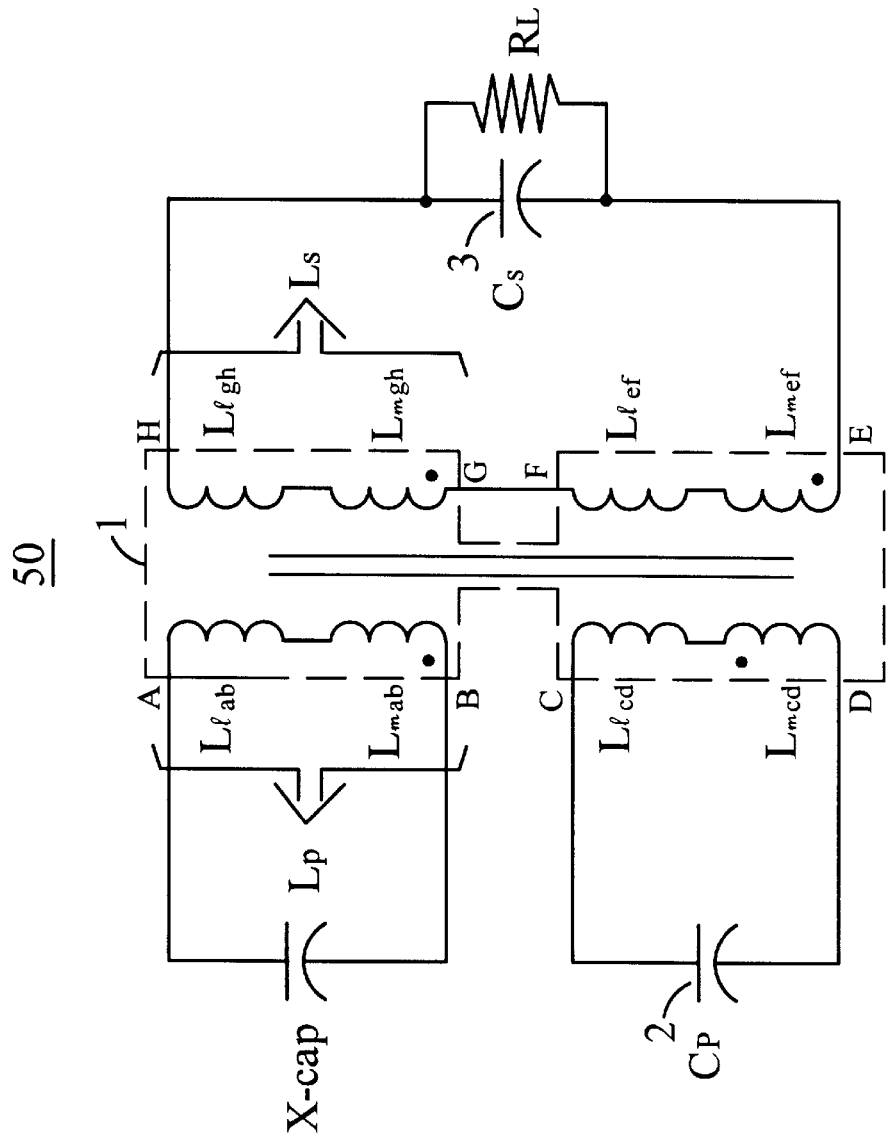
FIG. 16A is an equivalent-circuit schematic-diagram, with switch 4 closed, to illustrate the theoretical effects of the leakage-inductances.
Figure 17A:
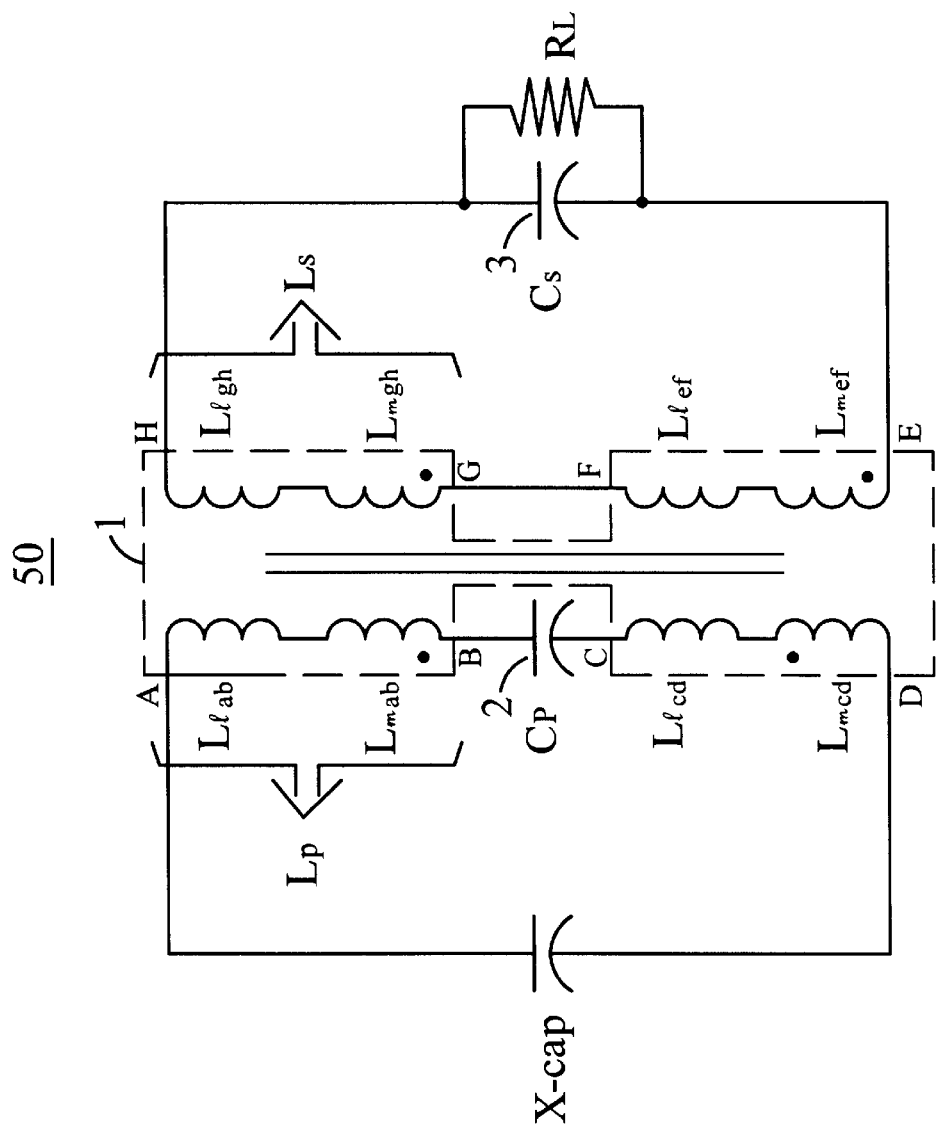
FIG. 17A is an equivalent-circuit schematic-diagram, with switch 4 open, to illustrate the theoretical operation of the secondary-circuit when switch 4 is open and no longer transferring energy to the secondary.

There is no duality requirement, as with pulsed-DC excitation, since the ac-excitation and proper-turns-ratios will automatically maintain the volt-second or ampere-second balance in the transformer. Refer to FIGS. 16A or 17A, for clarity the windings of integrated-magnetic element 1 are labeled as AB, CD, EF, and GH. The polarization-dots show that input-inductor AB is connected as series-opposing with transformer primary-winding CD and that output-inductor GH is connected series-aiding with transformer secondary-winding EF. Compared to the Ćuk integrated-magnetic device, the polarization-configuration is less rigid. To maintain proper power-factor operation, the input-inductor AB will usually be connected series-opposing with winding CD. This configuration allows the inductance looking into the circuit, from the source, to decrease when switch 4 is non-conducting, thus allowing capacitor 2 to charge quickly from the low-frequency source. Likewise, when switch 4 is conducting, the inductance can be maintained at a high impedance to the high-switching-frequency. Again, the polarization ratio between primary and secondary is less restrictive than in the Ćuk. The winding EF and output-inductor GH are connected series-aiding to provide the highest inductance value to provide the highest secondary-circuit Q. A priori, reversing the polarization of the secondary windings to a series-opposing configuration could be beneficial if a net-smaller output-inductance were needed.

Another subtle problem is testing the polarization of the integrated-magnetic-element. The preferred technique is to first arbitrarily define the primary-transformer-winding CD as the reference. Designate the polarization-dot as desired or needed, refer to FIGS. 16A or 17A, in those examples the polarization-dot is placed on the C-end of the primary-transformer-winding. Using the C-reference point, determine the polarization of each winding in relationship to C. The preferred-method is to use a small ac-signal at a test-frequency in the switching-frequency range. By referencing each winding to the reference-winding, the proper polarization can be determined and assured. It is highly advised to NOT use the popular-technique of connecting windings together and then measuring the net inductance. If the gap or leakage-inductance is larger than needed, the leakage-inductance will defeat the aiding or opposing net-inductance measurement. This erroneous measurement can be extremely confusing. The circuit may operate perfectly with a larger-than-needed gap but the leakage-inductance problem will make the design procedure more difficult.

The other subtle issue is the inductors that are wound on the outer legs. If the net-inductance is measured by connecting the windings as series aiding or opposing, the net-inductance will again be erroneous. The polarization-dots are referenced to the reference-winding only and are not correct with respect to each other because the inductors are wound on the outer legs thus the fluxes in the inductors oppose each other.

The invention can be viewed or analyzed as two separate, but interconnected, circuits. The first circuit arises when switch 4 is conducting and the second circuit arises when switch 4 is non-conducting. FIG. 16A shows the resulting equivalent-circuit when switch 4 is conducting (closed) and FIG. 17A shows the circuit when switch 4 is non-conducting (open). FIGS. 16A and 17A show the presence of an optional capacitor designated as an X-cap. The X-cap designation implies that it is an EMI filter capacitor with the safety rating of X 1 or 2. It is typically placed in front of any switching-converter as part of the EMI filter. The two equivalent-circuits do not show the other typical components of the EMI filter because the low-impedance of the X-cap will dominate the high-impedance of the typical common-mode filter. FIGS. 16A and 17A also show the presence of the leakage-inductance (L) for each winding.

NOTE: For clarity and simplification of the following mathematical equations, the legal-descriptive component designation, such as capacitor 2, will be replaced by the functional-circuit designations, such as $C_P$.

Referring to FIG. 16A, switch 4 is connected from point B to point D. Initially, switch 4 will be non-conducting and capacitor 2 (primary-capacitor $C_P$) will charge to the input-voltage. When switch 4 is conducting, the energy stored on $C_P$ is connected directly to winding CD. At the same time, the X-cap is connected directly to winding AB (primary-inductor $L_P$). Winding CD will transfer the single-ended half-sine-wave voltage to secondary winding EF, according to the transformer polarization-configuration (inverting as shown in the examples). The energy transfer begins a RLC-resonance in the secondary-circuit.

Figure 16B:
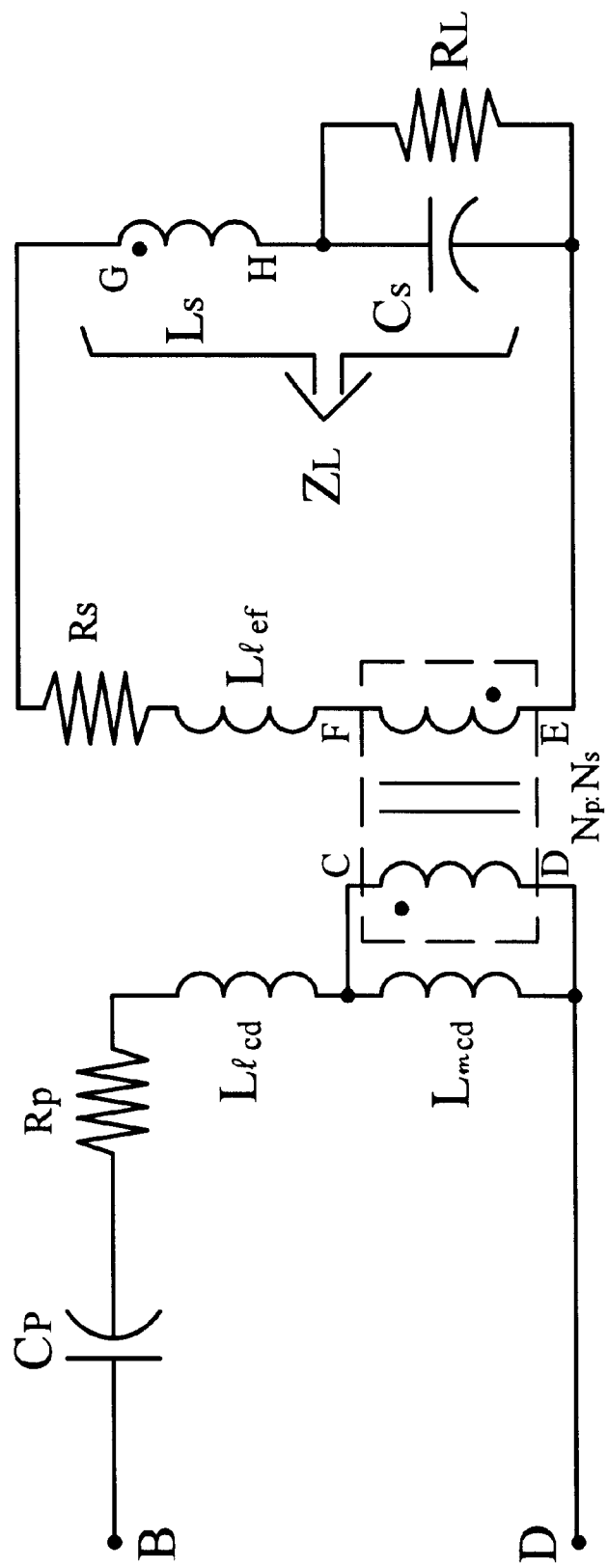
FIG. 16B is an equivalent-circuit schematic-diagram, with switch 4 closed, in a classical equivalent-circuit form.
Figure 16C:
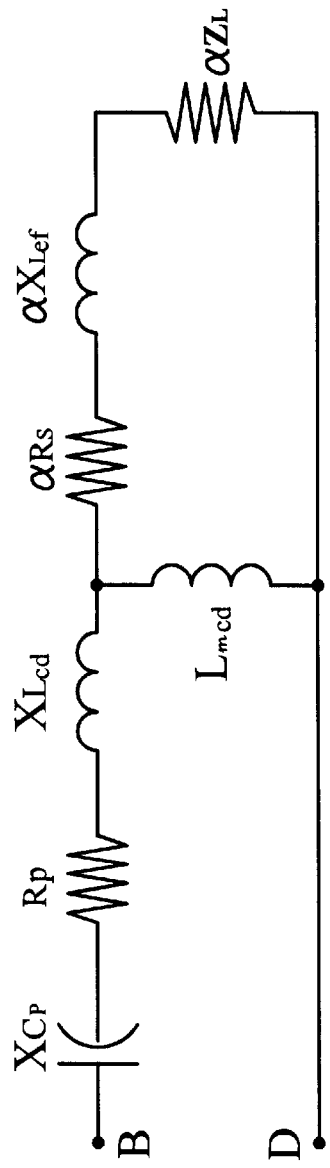
FIG. 16C is an equivalent-circuit schematic-diagram, with switch 4 closed, to illustrate the theoretical effect, on the primary circuit, of the secondary reflected impedance.

FIG. 16B shows a more classical equivalent-circuit configuration of FIG. 16A looking into the primary-circuit at the points B and D, as experienced by switch 4. The transformer (windings CD:EF) is broken into the ideal-transformer CD:EF, the primary magnetizing-inductance $L_M$, the series CD winding leakage-inductance L, and primary series-resistance $R_P$. The secondary-winding is broken into the ideal-winding EF, the leakage-inductance, and the secondary series-resistance $R_S$. The output-inductor $L_S$ and the parallel combination of $C_S$ and load $R_L$ are designated as the output-impedance $Z_L$. Impedance $Z_L$ is the load impedance on the transformer. In these examples, the winding-to-winding-capacitances are ignored because extensive circuit analysis and measurements indicate that the winding-to-winding-capacitance have little effect on the circuit-operation at modest switching-frequencies. At higher switching-frequencies, the complexity of the equivalent-circuit must increase with the additional winding-to-winding capacitive-reactances. Likewise, when switch 4 is conducting the X-cap and primary-inductor ($L_P$) can be ignored. When the secondary elements are reflected to the primary, FIG. 16B becomes FIG. 16C. FIG. 16C shows the reflected-secondary-impedance as seen by switch 4, at points B and D.

Two good references on equivalent transformer-coupled circuits and reflected-impedances are given by Jackson, in *INTRODUCTION TO ELECTRIC CIRCUITS*, pages 540–544 and by Fitzgerald et al, in *BASIC ELECTRICAL ENGINEERING*, pages 590–596.

As discussed, the load-impedance $Z_L$ is determined by $L_S$ in series with the parallel-combination $Z_{RC}$ that consists of $C_S$ and load $R_L$. Classically, the equivalent-circuit designates the secondary-reflected-impedance as $\alpha^2 Z_L$. The transformer ratios are as follows:

$$\frac{N_p}{N_s} = \sqrt{\frac{Z_p}{Z_s}}$$

$$Z_p = \left(\frac{N_p}{N_s}\right)^2 Z_s$$

Classically, α is defined as $$\alpha = \frac{N_p}{N_s}$$

For clarity and simplification, let α be defined as $$\alpha = \left(\frac{N_p}{N_s}\right)^2$$

Then the reflected-secondary-impedance will become $$Z_p = \alpha Z_s$$

Figure 16D:
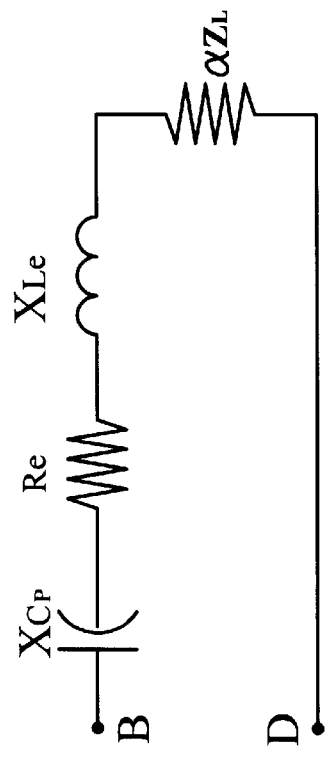
FIG. 16D is a simplified equivalent-circuit schematic-diagram to illustrate the theoretical effect of the secondary reflected impedance on the closed switch 4.

Referring to FIG. 16C, the secondary Rs is reflected to the primary as $\alpha R_s$, $X_{Lef}$ will be reflected as $\alpha X_{Lef}$, and $Z_L$ will be reflected as $\alpha Z_L$. The reactance of the magnetizing-inductance ($L_m$) is generally very large compared to the reflected-secondary-impedance so it can be ignored. The two resistors can be combined into an effective-$R_e$, with $R_e = R_P + \alpha R_S$. The two leakage-inductances can be combined into an effective-$X_{Le}$, with $X_{Le} = X_{Lcd} + \alpha X_{Lef}$. The final simplified equivalent-circuit is shown in FIG. 16D. FIG. 16D is the load as seen by switch 4 at points B and D.

The second circuit of interest is when switch 4 is non-conducting (open) as shown in FIG. 17A. By this point in time, all of the energy needed by the secondary series-resonant circuit is already stored in the secondary series-resonant circuit. The primary circuit becomes a series LCLC circuit. The X-cap will dominate the primary-circuit because the X-cap will normally be several-orders-of-magnitude smaller than the primary-capacitor $C_P$. The reflected-primary-impedance becomes quite complex when the primary-impedance is also reflected to the secondary through the coupling-inductor formed by $L_P$ and $L_S$. This reflected-primary-impedance will be discussed in sequence. The secondary-circuit continues to operate as a series-resonance circuit when switch 4 is non-conducting because the stored-energy, provided when switch 4 was conducting, is now averaged to produce a sine-wave output.

Figure 17B:
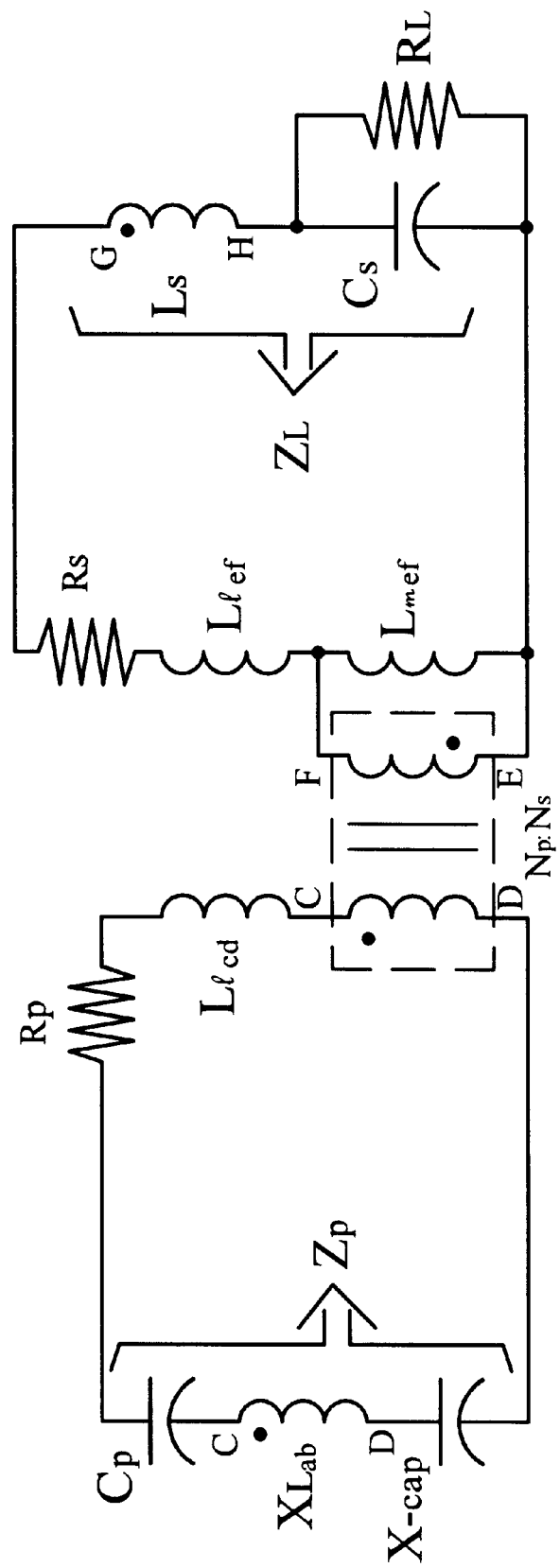
FIG. 17B is a classic equivalent-circuit schematic-diagram, with switch 4 open, in a classical equivalent-circuit form.
Figure 17C:
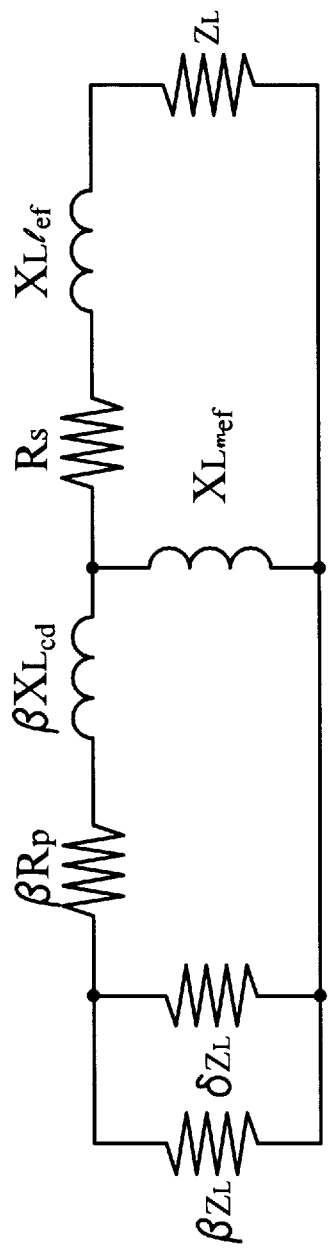
FIG. 17C is an equivalent-circuit schematic-diagram to illustrate the theoretical effect, on the secondary-circuit, of the reflected primary impedance via the AB:GH winding, when switch 4 is open.
Figure 17D:
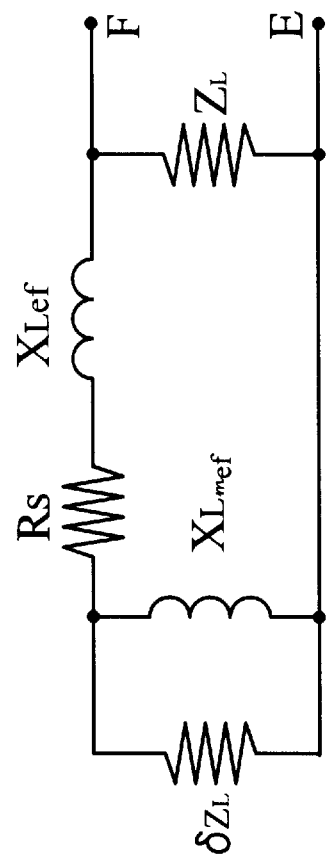
FIG. 17D is a simplified equivalent-circuit schematic-diagram to illustrate the theoretical operation of the secondary operating from the energy stored in the secondary-circuit and the effect from the primary reflected-impedance.

FIG. 17B shows FIG. 17A as a classical equivalent-circuit. Since all of the energy is stored in the secondary series-resonant circuit, the primary-circuit acts as a load to the secondary-circuit. $C_P$, $L_P$, and the X-cap are grouped into the primary-impedance $Z_P$. The reflected-primary-impedance is shown in FIG. 17C. The primary-reflected-impedance is determined by the turns-ratio discussed earlier and follows the format $$\beta = \left(\frac{N_s}{N_p}\right)^2$$

Hence, the primary-impedances are reflected as β times each element as shown.

The reflected-impedance via the coupling-inductances cannot be ignored. The reflected-impedance is determined by the turns-ratio of the coupling-inductors and basically follows the format $$\delta = \left(\frac{N_{Ls}}{N_{Lp}}\right)^2$$

The δ $Z_L$ element is shown, in FIG. 17C, highly simplified based on extensive analysis and measurements. The δ $Z_L$ element will generally simplify to a value of δ times the X-cap. Depending on the turns-ratio of the coupling-inductors, the reflected-capacitance values can cause problems on both sides of the circuit. Multiplying the reflected-impedance of the X-cap can interfere with operation at higher frequencies. A very good turns-ratio to avoid complications is a 1:1 ratio. There is a fair amount of flexibility in the coupling-inductors turns-ratio but this potential complication should not be overlooked.

CONCLUSION, RAMIFICATION, AND SCOPE OF INVENTION

Accordingly, the reader will see that I have provided an electronic method and apparatus whereby the invention will have a significant impact on global energy consumption with the 92% to 96% efficiency and inherent near-unity power factor. The products will range from portable products, such as computers, communication, and portable tools, to large electrochemical plants. The simple control method and variable output allows control of ac or DC motors to ballast dimming. The ability to parallel outputs and hot-plug units together will allow small 5 watt power supplies to megawatt power sources.

I claim:

1. A power converter for receiving a DC input and providing a variable AC output, said converter comprising:
    an input terminal and a return terminal for receiving said DC input;
    an input inductor, an input capacitor, and a transformer having a primary and a secondary winding, said input inductor, said input capacitor, and said primary winding connected in series between said input terminal and said return terminal;
    a controllable switch having a control terminal for receiving a control signal to open and close said switch at predetermined intervals, said switch connecting the junction of said input inductor and input capacitor with said return terminal; and
    an output circuit comprising an output inductor, an output capacitor, and said secondary winding connected in series;
    such that when said controllable switch is opened and closed at said predetermined intervals said capacitor is alternatively charged by said DC input and then discharged across said primary winding, which transfers the energy of said discharge to said secondary winding, and the inductors, capacitors, and transformer having parameters selected whereby a waveform of predetermined wave shape, amplitude, frequency, phase, and damping factor is created in said output circuit.

2. The power converter of claim 1, wherein said output circuit further comprises output terminals connected across said output capacitor.

3. The power converter of claim 2, further comprising a DC output stage, said DC output stage connected to said output terminals, whereby a DC output is developed from said AC output.

4. A power converter for receiving an AC or DC input and providing a variable AC output, said converter comprising:
    a first input terminal and a second input terminal for receiving said input;
    an input inductor, an input capacitor, and a first output inductor connected in series between said first input terminal and second input terminal with said input capacitor between said input inductor and said output inductor;
    a controllable switch having a control terminal for receiving a control signal to open and close said switch at predetermined intervals;
    a rectifier connecting the junction of said input inductor and said input capacitor with said second input terminal, the controllable switch in series with the current path through said rectifier connected such that a rectified signal biased in accordance with the polarity of said switch is impressed across said switch; and
    an output circuit comprising an output capacitor connected in parallel with said first output inductor;
    such that when said controllable switch is opened and closed at said predetermined intervals said input capacitor is alternatively charged by said input and then discharged through said first output inductor, and the inductors and capacitors having parameters selected whereby a waveform of predetermined wave shape, amplitude, frequency, phase, and damping factor is created in said output circuit.

5. The power converter of claim 4, wherein said output circuit further comprises output terminals connected across said output capacitor.

6. The power converter of claim 5, further comprising a DC output stage, said DC output stage connected to said output terminals, whereby a DC output is developed from said AC output.

7. The power converter of claim 4, further comprising a second output inductor connected in series with said output capacitor, and wherein said series combination of said second output inductor and said output capacitor is in parallel with said first output inductor, said first output inductor and said second output inductor being configured as a single tapped inductor with the inductance of said first output inductor being greater than the inductance of said second output inductor.

8. The power converter of claim 7, wherein said input and output inductors are integrated on a single magnetic element, whereby said input and output inductors are magnetically coupled.

9. The power converter of claim 7, wherein said input inductor is discrete from said output inductors.

10. The power converter of claim 7, wherein said input inductor and said first output inductor are series opposing.

11. A power converter for receiving a DC input and providing a variable AC output, said converter comprising:
    an input terminal and a return terminal for receiving said DC input;
    an input inductor, an input capacitor, and a first output inductor connected in series between said input terminal and said return terminal with said input capacitor between said input inductor and said output inductor;
    a controllable switch having a control terminal for receiving a control signal to open and close said switch at predetermined intervals, said switch connecting the junction of said input inductor and input capacitor with said return terminal; and
    an output circuit comprising an output capacitor connected in parallel with said first output inductor;
    so that when said controllable switch is opened and closed at said predetermined intervals said input capacitor is alternatively charged by said DC input and then discharged through said first output inductor, the inductors and capacitors having parameters selected whereby a waveform of predetermined wave shape, amplitude, frequency, phase, and damping factor is created in said output circuit.

12. The power converter of claim 11, wherein said output circuit further comprises output terminals connected across said output capacitor.

13. The power converter of claim 12, further comprising a DC output stage, said DC output stage connected to said output terminals, whereby a DC output is developed from said AC output.

14. A power converter for receiving an AC or DC input and providing a variable AC output, said converter comprising:
   an input stage and an output stage;
   said input stage comprising:
      input means for receiving said input;
      a capacitor for storing energy from said input;
      a means for transferring energy from said input stage to said output stage;
      means for creating a charge path across said capacitor, said charge path comprising
         current regulation means in series with said capacitor; means for creating a discharge path for said capacitor, said discharge path
         comprising said energy transferring means in series with said capacitor; means for controllably charging and discharging said capacitor;
   said output stage comprising:
      means for receiving energy from said energy transferring means;
      resonant circuit means responsive to said energy for creating an AC emf; and
      output means for expressing said AC emf.

15. The power converter of claim 14, further comprising a DC output stage connected to said output means, whereby a DC output is developed from said AC or DC input.

16. A power converter for receiving an AC or DC input and providing a variable AC output, said converter comprising:
   a first input terminal and a second input terminal for receiving said input;
   an input inductor, an input capacitor, and a transformer having a primary and a secondary winding, said input inductor, said input capacitor, and said primary winding connected in series between said first input terminal and second input terminal with said input capacitor between said input inductor and said primary winding;
   a controllable switch having a control terminal for receiving a control signal to open and close said switch at predetermined intervals;
   a rectifier connecting the junction of said input inductor and said input capacitor with said second input terminal, the controllable switch in series with the current path through said rectifier connected such that a rectified signal biased in accordance with the polarity of said switch is impressed across said switch; and
   an output circuit comprising an output inductor, an output capacitor, and said secondary winding connected in series;
such that when said controllable switch is opened and closed at said predetermined intervals said input capacitor is alternatively charged by said input and then discharged across said primary winding, which transfers the energy of said discharge to said secondary winding, and the inductors, capacitors, and transformer having parameters selected whereby a waveform of predetermined wave shape, amplitude, frequency, phase, and damping factor is created in said output circuit.

17. The power converter of claim 16, wherein said input is substantially described as a damped sine wave with a predetermined damping factor.

18. The power converter of claim 16, wherein said output circuit further comprises output terminals connected across said output capacitor.

19. The power converter of claim 18, further comprising a DC output stage, said DC output stage connected to said output means, whereby a DC output is developed from said AC output.

20. The power converter of claim 16, wherein said input and output inductors and said transformer are integrated on a single magnetic element, whereby said input and output inductors are magnetically coupled.

21. The power converter of claim 20, wherein said output inductor and said secondary winding are wound series-aiding.

22. The power converter of claim 20, wherein said output inductor and said secondary winding are wound series-opposing.

23. The power converter of claim 20, wherein said input inductor and said primary winding are wound series-opposing.

24. The power converter of claim 20, wherein said input inductor and said primary winding are wound series-aiding.

25. The power converter of claim 20, wherein said primary winding and said secondary winding of said transformer have the same polarity.

26. The power converter of claim 20, wherein said primary winding and said secondary winding of said transformer have the opposite polarity.

27. The power converter of claim 20, wherein said integrated magnetic element provides transformer isolation for output means from said input receiving means.

28. The power converter of claim 16, wherein said input and output inductors and said transformer are discrete elements.

29. The power converter of claim 16, further comprising a shunt capacitor connecting said first input terminal with said second input terminal for EMI filtering.

30. The power converter of claim 16, wherein said input is substantially described as a sine wave.

31. The power converter of claim 16, wherein said input is substantially described as a half sine wave.

* * * * *